US011468867B2

(12) United States Patent
Ahmed

(10) Patent No.: US 11,468,867 B2
(45) Date of Patent: Oct. 11, 2022

(54) SYSTEMS AND METHODS FOR AUDIO INTERPRETATION OF MEDIA DATA

(71) Applicant: COMMUNOTE INC., Toronto (CA)

(72) Inventor: Kemal S. Ahmed, Toronto (CA)

(73) Assignee: COMMUNOTE INC., Toronto (CA)

( * ) Notice: Subject to any disclaimer, the term of this patent is extended or adjusted under 35 U.S.C. 154(b) by 269 days.

(21) Appl. No.: 16/829,957

(22) Filed: Mar. 25, 2020

(65) Prior Publication Data
US 2020/0312280 A1 Oct. 1, 2020

(30) Foreign Application Priority Data

Mar. 25, 2019 (CA) ................ CA 3037908

(51) Int. Cl.
| | | |
|---|---|---|
| G09G 5/37 | (2006.01) |
| G10L 25/51 | (2013.01) |
| G10H 1/00 | (2006.01) |
| G06F 3/16 | (2006.01) |
| H04R 3/04 | (2006.01) |

(52) U.S. Cl.
CPC ............ *G09G 5/37* (2013.01); *G06F 3/165* (2013.01); *G10H 1/0008* (2013.01); *G10L 25/51* (2013.01); *H04R 3/04* (2013.01); *G09G 2354/00* (2013.01); *G10H 2210/071* (2013.01); *G10H 2210/076* (2013.01)

(58) Field of Classification Search
CPC ...... G09G 5/37; G09G 2354/00; G06F 3/165; G10H 1/0008; G10H 2210/071; G10H 2210/076; G10H 1/40; G10H 2220/005; G10H 2210/341; G10H 2220/081; G10H 2220/091; G10H 2220/131; G10L 25/51; G10L 21/10; H04R 3/04
See application file for complete search history.

(56) References Cited

U.S. PATENT DOCUMENTS

| | | | |
|---|---|---|---|
| 7,812,885 B2 | 10/2010 | Molaro et al. |
| 2008/0196575 A1 | 8/2008 | Good |

(Continued)

FOREIGN PATENT DOCUMENTS

CN 105513583 A * 4/2016 ............. G10H 1/361

OTHER PUBLICATIONS

CIPO, Office Action for Canadian Patent Application No. 3,037,908 dated Jun. 8, 2020.

*Primary Examiner* — Jeffery A Brier
(74) *Attorney, Agent, or Firm* — Norton Rose Fulbright Canada LLP

(57) ABSTRACT

A system and method for providing acoustic output is disclosed, the system comprising a communication device, a processor coupled to the communication device, and a memory coupled to the processor. The processor receives multimedia data associated with a multimedia output stream, extracts audio data based on the multimedia data, and generates a rhythmic data set including time-series acoustic characteristic data based on the extracted audio data. A sequence of visual elements is generated based on the time-series acoustic characteristic data and associated with the respective visual elements in the sequence of visual elements with the multimedia data. The multimedia data for visually displaying the acoustic characteristic data concurrently with the multimedia stream is transmitted to a multimedia output device.

18 Claims, 12 Drawing Sheets

(56) References Cited

U.S. PATENT DOCUMENTS

2011/0319160 A1 12/2011 Arn et al.
2015/0006174 A1* 1/2015 Homma .................. G10L 15/02
　　　　　　　　　　　　　　　　　　　　704/235

* cited by examiner

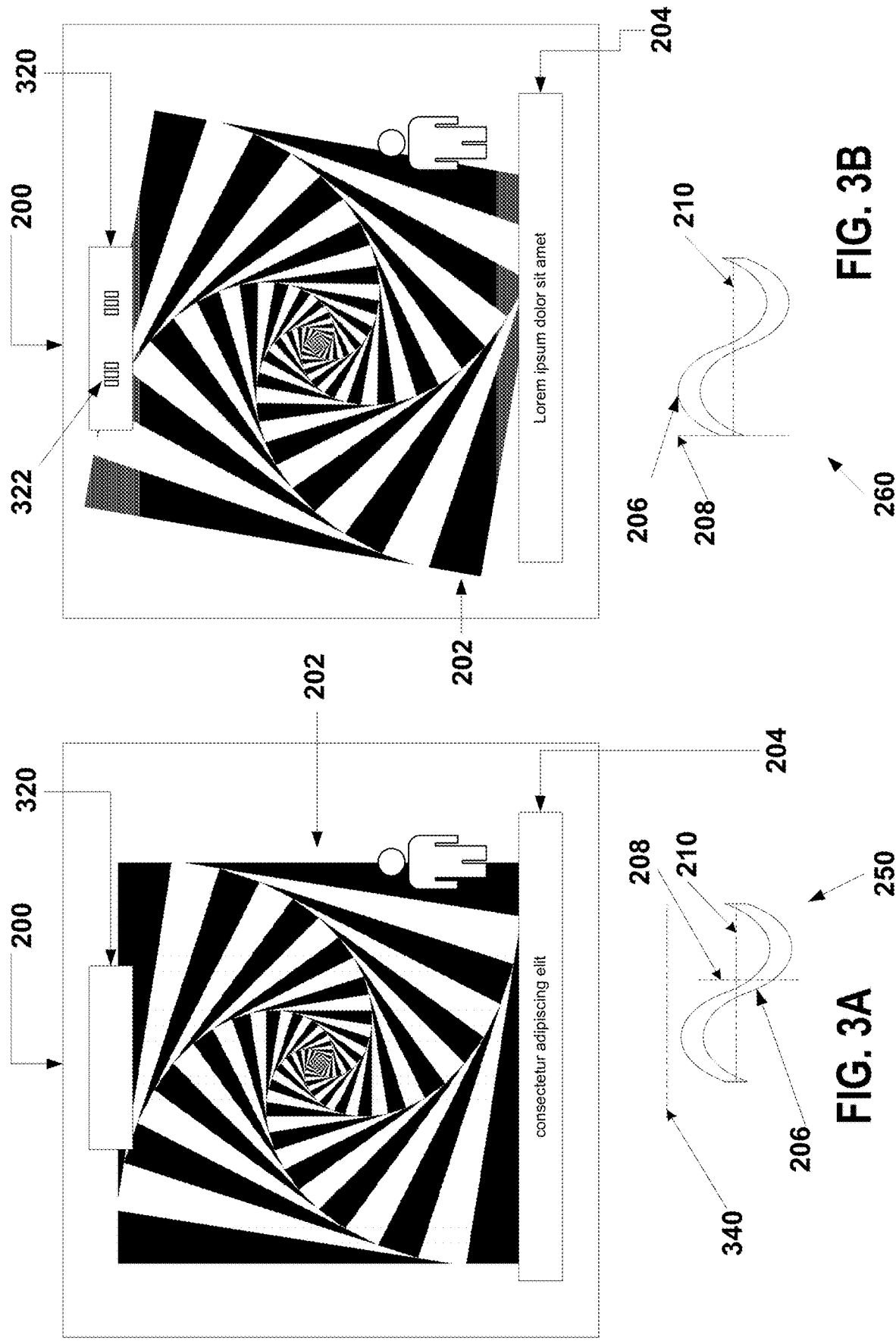

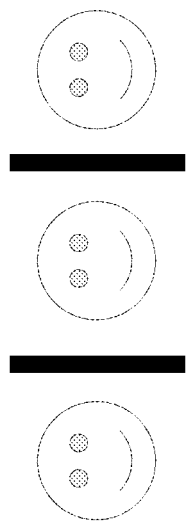
FIG. 4D
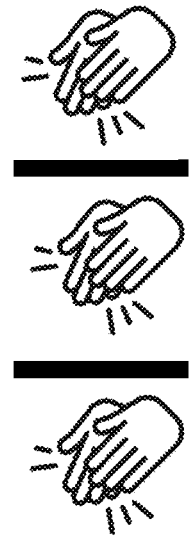
FIG. 4E
FIG. 4A
FIG. 4B
FIG. 4C
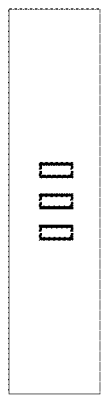

SYSTEMS AND METHODS FOR AUDIO INTERPRETATION OF MEDIA DATA

CROSS REFERENCE TO RELATED APPLICATIONS

This application claims priority from Canadian Patent Application No. 3,037,908, entitled "BEAT TRACKING VISUALIZATION THROUGH TEXTUAL MEDIUM", filed on Mar. 25, 2019, the entire contents of which are hereby incorporated by reference herein.

FIELD

The present disclosure generally relates to multimedia data processing, and more specifically, directed to systems and methods for audio interpretation of media data.

BACKGROUND

Multimedia data may include data associated with one or more combinations of content forms, such as text, audio, images, animations, video, or interactive content. In some examples, closed captions are meant to give a textual representation of audible sounds including spoken words. In some examples, closed captions associated video data with can convey information to a user when audio output cannot be heard, such as when a video display may be in a noisy environment or may be in a quiet environment.

SUMMARY

Systems and methods for audio data processing for aiding audio interpretation (e.g. beat tracking) are described herein in various embodiments.

In some embodiments, systems and methods of the present disclosure may provide visual elements associated with rhythmic data of a multimedia output stream, such that the user may experience the rhythm of a song when audible acoustic output may be limited. For users who may be in noisy or quiet environments or may be hard of hearing, embodiments of the present application provide visual elements that track and display rhythmic data such that the users may track the beat, tempo, beat duration, or the like while viewing a multimedia output stream (e.g. video).

In some examples, systems and methods for audio data processing for audio interpretation present challenging technical problems, as transferring sensations and information from audio data requires translating the audio data information into a visual feature which a user can quickly and accurately interpret without detracting from the visual experience. Challenging technical problems arise in determining which audio data should be conveyed as a result of the difficulty of separating the audio data into elements which aid interpretation and noise.

In an example aspect, a system for providing acoustic output comprising a processor, and a memory coupled to the processor is disclosed. The memory stores processor-executable instructions that, when executed, configure the processor to receive multimedia data associated with a multimedia output stream and extract audio data based on the multimedia data. The processor generates a rhythmic data set including time-series acoustic characteristic data based on the extracted audio data, and generates a sequence of visual elements based on the time-series acoustic characteristic data and associate the respective visual elements in the sequence of visual elements with the multimedia data. The processor transmits, to a multimedia output device, the sequence of visual elements for visually displaying the acoustic characteristic data concurrently with the multimedia output stream.

In some embodiments, the time-series acoustic characteristic data includes at least one of beat, meter, tempo, syncopation, and polyrhythm data.

In some embodiments, visually displaying the acoustic characteristic data concurrently with the multimedia stream includes pulsating, on the multimedia output device, the sequence of visual elements based on the acoustic characteristic data.

In some embodiments, generating the rhythmic data set includes sampling the extracted data based on a configured time-window.

In some embodiments, the audio data includes an analog signal waveform, and generating the rhythmic data set includes filtering the analog signal waveform based on at least one of a band pass filter, a low pass filter, and a high pass filter to provide a filtered analog signal waveform associated with a frequency range of the audio data; and detecting amplitude peaks based on threshold analysis of the analog signal waveform. The generated rhythmic data set may include two or more subsets rhythmic data, the respective subsets of rhythmic data associated with rhythmic data for a frequency range. Detecting amplitude peaks may be based on a dynamic threshold.

In some embodiments, in the rhythmic data set includes two or more acoustic characteristic data sets, the two or more acoustic characteristic data sets including beat data associated with at least one of low-frequency range acoustic data, mid-frequency range acoustic data, and high frequency range acoustic data, and wherein the two or more acoustic characteristic data sets are respectively associated with a distinct sequence of visual elements.

In some embodiments, the audio data includes a digital data set, and wherein generating the rhythmic data set includes sampling the audio data based on a sample rate and identifying acoustic characteristic data based on digital data pattern recognition.

In some embodiments, the sequence of visual elements includes at least one of a geometric shape, an emoticon, and a screen interface element in combination with closed caption output associated with the multimedia output stream.

In another example aspect, a method of providing acoustic data output includes: receiving multimedia data associated with a multimedia output stream, extracting audio data based on the multimedia data, generating a rhythmic data set including time-series acoustic characteristic data based on the extracted audio data, generating a sequence of visual elements based on the time-series acoustic characteristic data and associate the respective visual elements in the sequence of visual elements with the multimedia data, and transmitting, to a multimedia output device, the sequence of visual elements for visually displaying the acoustic characteristic data concurrently with the multimedia output stream.

In some embodiments, the time-series acoustic characteristic data includes at least one of beat, meter, tempo, syncopation, and polyrhythm data.

In some embodiments, visually displaying the acoustic characteristic data concurrently with the multimedia stream includes pulsating, on the multimedia output device, the sequence of visual elements based on the acoustic characteristic data.

In some embodiments, generating the rhythmic data set includes sampling the extracted data based on a configured time-window.

In some embodiments, the audio data includes an analog signal waveform, and generating the rhythmic data set includes: filtering the analog signal waveform based on at least one of a band pass filter, a low pass filter, and a high pass filter to provide a filtered analog signal waveform associated with a frequency range of the audio data; and detecting amplitude peaks based on threshold analysis of the analog signal waveform. The generated rhythmic data set may include two or more subsets rhythmic data, the respective subsets of rhythmic data associated with rhythmic data for a frequency range. Detecting amplitude peaks may be based on a dynamic threshold.

In some embodiments, the rhythmic data set includes two or more acoustic characteristic data sets, the two or more acoustic characteristic data sets including beat data associated with at least one of low-frequency range acoustic data, mid-frequency range acoustic data, and high frequency range acoustic data, and wherein the two or more acoustic characteristic data sets are respectively associated with a distinct sequence of visual elements.

In some embodiments, the audio data includes a digital data set, and wherein generating the rhythmic data set includes sampling the audio data based on a sample rate and identifying acoustic characteristic data based on digital data pattern recognition.

In some embodiments, the sequence of visual elements includes at least one of a geometric shape, an emoticon, and a screen interface element in combination with closed caption output associated with the multimedia output stream.

In another example aspect, a non-transitory computer-readable medium or media having stored thereon machine interpretable instructions which, when executed by a processor, cause the processor to perform a computer implemented method of providing acoustic data output are disclosed. The method includes: receiving multimedia data associated with a multimedia output stream, extracting audio data based on the multimedia data, generating a rhythmic data set including time-series acoustic characteristic data based on the extracted audio data, generating a sequence of visual elements based on the time-series acoustic characteristic data and associate the respective visual elements in the sequence of visual elements with the multimedia data, and transmitting, to a multimedia output device, the sequence of visual elements for visually displaying the acoustic characteristic data concurrently with the multimedia output stream.

The systems described herein are implemented using computing devices having a combination of software and hardware, or embedded firmware. The computing devices are electronic devices that include processors (e.g. hardware computer processors), and computer memory, and operate in conjunction with data storage, which may be local or remote. Software may be affixed in the form of machine-interpretable instructions stored on non-transitory computer readable media, which cause a processor to perform steps of a method upon execution.

In some embodiments, the computing devices are specially adapted purpose machines, such as rack server appliances, that are configured to be installed within data centers and adapted for interconnection with back-end data sources for generating and/or maintaining rhythmic data sets. The special purpose machines, for example, may have high performance computing components and operate as computing super-nodes to more efficiently generate and/or maintain the rhythmic data set.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein, will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures:

FIG. 3A is a diagram of an example multimedia output device displaying a sequence of visual elements and an example of wave form representation of a time-series acoustic characteristic data, according to some embodiments.

FIG. 3B is a diagram of an example multimedia output device displaying a sequence of visual elements and an example of wave form representation of a time-series acoustic characteristic data, according to some embodiments.

FIGS. 4A-4E are diagrams of example sequences of visual elements, according to some embodiments.

DETAILED DESCRIPTION

Figure 1:
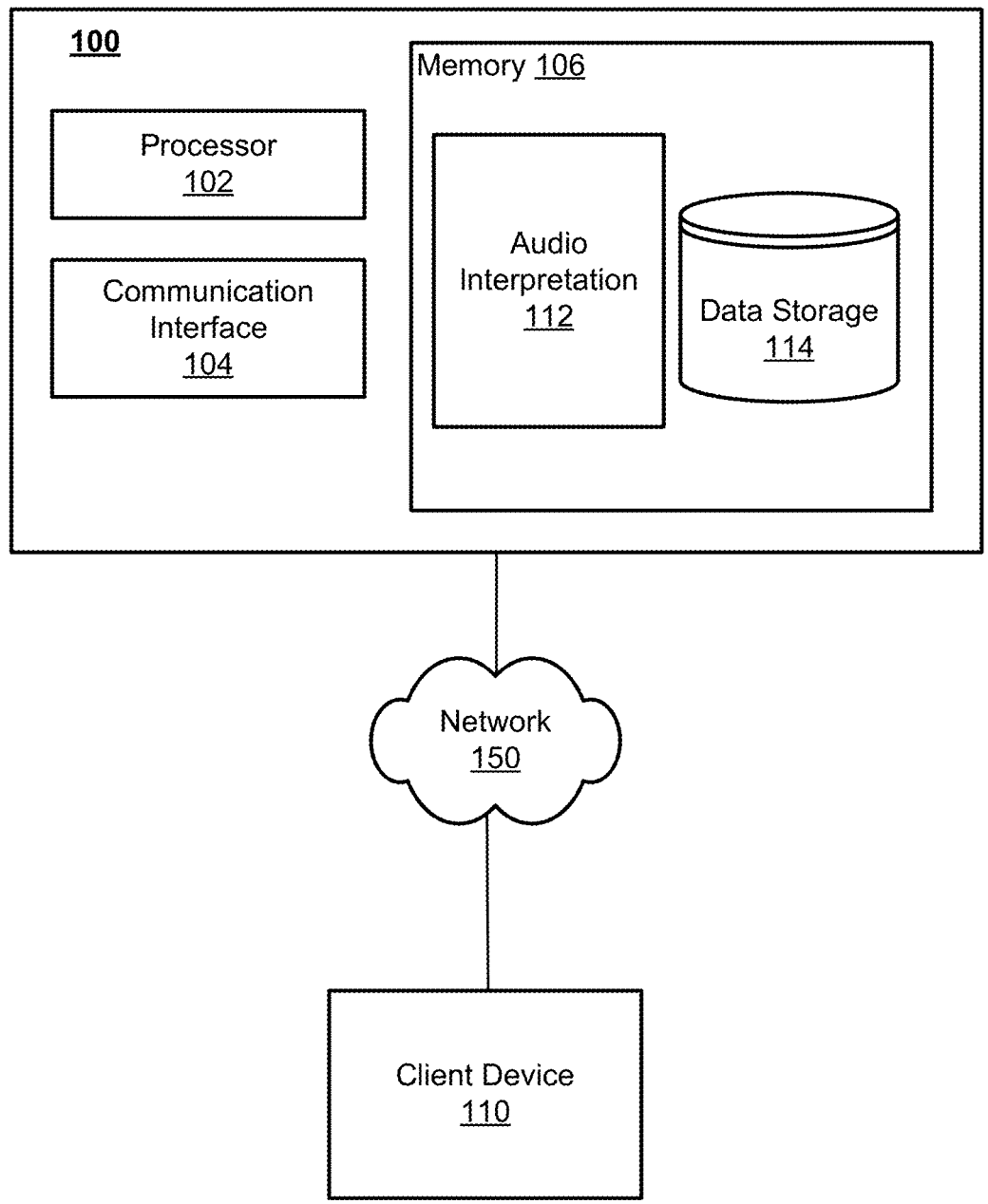
FIG. 1 is a block schematic of an example system for audio interpretation, according to some embodiments.

The present disclosure may provide systems and methods for audio data processing for aiding audio interpretation. In some embodiments, the systems may be for beat tracking.

In some examples, display devices may be configured to provide closed captions for providing textual representation of audible sounds, including spoke words and brief textual descriptions of other types of sounds. Closed captions may be useful for users having hearing loss or are users who are hard of hearing. Closed captions may be useful for users who may be viewing multimedia output streams (e.g. videos) when the audio cannot be heard (e.g. noisy environment or designated quiet environment).

In some embodiments, closed captions may not provide sufficient information to accurately convey the nature of audible sound or music to a user. For example, when a television device provides audible sounds, such as music, a user's experience of the music requires an appreciation of lyrics in combination with a collection of temporally spaced sounds. The user's experience of the music may be dependent on receiving rhythmic data associated with music or sounds. For example, the user's experience of the music may be dependent on being able to track the beat of the music, the tempo, or other characteristics of rhythm.

Approaches which convey audio information from multimedia data to users in a timely, computationally efficient, accurate, or intuitive manner are desired. Approaches which convey audio information without being intrusive, supplanting the existing visual information and detracting from the user experience, are desirable. Approaches conveying the information from the audio data to improve the hard of hearing user experience are desirable.

However, the essence of acoustic characteristics of acoustic data may not be fully conveyed through text of closed caption. Improved output to convey this type of information is desirable.

As described further, systems and methods for audio data processing include generating a rhythmic data set based on one or more time-series acoustic characteristic data within a multimedia data set. The rhythmic data set is associated with a sequence of visual elements for displaying concurrently with the multimedia data in order to convey information to aid audio interpretation.

In some embodiments, for example a beat tracking system, the rhythmic data set includes a start and end time to each beat corresponding to music (and in example embodiments, associated with a video), and the rhythmic data set is used to toggle the display of a word or symbol, i.e. displaying the text to the rhythm of the audio. Rhythmic data sets comprising a start and end time to each beat in a video or audio recording may enable rhythmic data sets to be incorporated into the same format as existing closed captioning technology, such as WebVTT used in internet applications, which defines the beginning and end times for when each set of text should be shown and displayed.

Closed captions (i.e. closed captions which display dialogue) may be intended to provide a textual representation of audio data which includes spoken words or brief descriptions of other types of sounds. While closed captioning standards were developed to aid hard of hearing users, the closed caption standard can be useful for a variety of situations. For example, the closed caption standard can facilitate reading when audio can not be interpreted, either because of a noisy environment, such as an airport, or because of an environment which requires silence, such as a hospital.

Where the rhythmic data set includes a start and end time to each beat in a video, for example in a beat tracking system, the rhythmic data set may be used and displayed on a portion of a screen separate from the dialogue closed captions stream.

The proposed rhythmic data set may be advantageous in a variety of applications, including participating in a smart cycling program. Smart cycling programs may include a smart exercise bike, receiving or retrieving a spin class or program to a display integrated with the exercise bike. The spin class may encourage a user to exercise the bike based on a song or music incorporated into the program, such that the RPM of the pedals of the bike are encouraged to be synchronized with the rhythm of the music. Rhythmic data sets may aid the user in participating with the spin class, or aid in interpreting the audio data in the spin class.

For audio data comprising of music, closed captions alone may not capture the information in the music. The information in the audio data comprising of music is dependent upon interpreting multiple sounds together, as opposed to individual sounds. Experiencing the rhythm of a song, for example, may be essential for the consumption of the multimedia data by the user, whether for dancing, exercising, or enjoyment.

Rhythmic information about music may sometimes be displayed as an analog signal graph that displays the volumes of different frequencies at the present moment. However, existing closed captioning technology may not be fitted to overlay large analog graphs. Large analog graphs would be intrusive to the video; it only works with displayed text.

There may be technical challenges associated with conveying information in audio data in a streaming application. While most programs may be captioned in advance of transmission, the nature of some programs, such as live sports events, required real time captioning. For real time captioning for speech within audio data, a stenographer or speech recognizing algorithm listens to the broadcast, generates a shorthand version, and the shorthand version is processed with a program that converts the shorthand into captions. The broadcaster of the streaming audio data adds the caption data to the multimedia data stream or television signal. The caption data could be a separate data stream relative to audio or video data in the multimedia data stream, or it may be encoded into the multimedia data stream, and it can be superimposed onto the picture. However, a stenographer or speech recognizing algorithm cannot convey information within the audio data related to one or more time-series acoustic characteristic data.

Displaying the sequence of visual elements associated with the rhythmic data set concurrently with the multimedia data can increase a user's ability to interpret the information within the audio data. For example, a hard of hearing user may be able to visually interpret the information contained in the audio data by interpreting the sequence of visual elements.

Generating rhythmic data sets may be important because it may obviate the need for hard of hearing users to require special equipment to be able to experience rhythmic information driven by music through vibration, lights and other mediums. Moreover, rhythmic data sets can be used by devices which are ubiquitous, such as mobile phones and computers that can use the rhythmic data set directly for many applications. Rhythmic data sets may not only enable hard of hearing users to experience musical rhythms, but can enhance experiences for everyone.

For users who may have reduced ability to hear acoustic output, closed captions may provide a means of interpreting speech. However, when experiencing multimedia data comprising time-series acoustic characteristic data, closed captions alone may not be sufficient to emulate the experience of a hearing persons receiving information from time-series acoustic characteristic data. Experiencing the rhythm of a song, for example, may be essential for consumption whether for dancing, exercising, or general enjoyment.

Most multimedia data are captioned for dialogue in advance of transmission, but the nature of some multimedia data, such as live sports events, requires real-time dialogue captioning. For real-time dialogue captioning, a stenographer or speech recognizing algorithm interprets the multimedia data and types a shorthand version of the dialogue into a computer application that converts shorthand into dialogue captions and adds the dialogue captions to the video stream or multimedia data (e.g. television signal). The dialogue caption data stream could be a data stream separate from the multimedia data stream, the dialogue caption data could be encoded into the video data stream or multimedia data stream, and superimposed onto the video.

Reference is now made to FIG. 1, which illustrates a system 100 for audio data processing for aiding audio interpretation, in accordance with an embodiment of the present application. The system 100 may transmit and/or receive data to/from a client device 110 via a network 150. The network 150 may include a wired or wireless wide area network (WAN), local area network (LAN), a combination thereof, or the like.

The system 100 includes a processor 102 configured to implement processor readable instructions that, when executed, configure the processor 102 to conduct operations described herein. For example, the system 100 may be configured to conduct operations for processing audio data to generate a rhythmic data set based on one or more time-series acoustic characteristic data within a multimedia data. Other operations may be contemplated.

In some embodiments, the system 100 may receive or obtain a multimedia data which is a time series data set (hereinafter referred to as a "multimedia data") from the client device 110. The multimedia data may be multimedia data streaming in real time, or streaming multimedia data of past events. For example, the multimedia data may represent a movie being streamed through a streaming service such as Netflix™ or a song being streamed through a streaming service such as Spotify™.

The system 100 may include a communication interface 104 to communicate with other computing devices, to access or connect to network resources, or to perform other computing applications by connecting to a network (or multiple networks) capable of carrying or processing data. In some embodiments, the network 150 may include the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including a combination of these.

In some examples, the communication interface 104 may include one or more busses, interconnects, wires, circuits, and/or any other connection and/or control circuit, or a combination thereof. The communication interface 104 may provide an interface for communicating data between components of a single device or circuit.

The system 100 may include memory 106. The memory 106 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 106 may store an audio interpretation application 112 including processor readable instructions for conducting operations described herein. In some examples, the audio interpretation application 112 may include operations for displaying a sequence of visual elements associated with rhythmic data sets. Other operations of the audio interpretation application 112 may be contemplated.

The system 100 may include a data storage 114. In some embodiments, the data storage 114 may be a secure data store. In some embodiments, the data storage 114 may store multimedia data, time series multimedia data, the audio interpretation application 112, or other types of data.

The client device 110 may be a computing device including a processor, memory, and a communication interface. In some embodiments, the client device 110 may be a computing device associated with a local area network. The client device 110 may be connected to the local area network and may transmit one or more data sets to the system 100. For example, the client device 110 may transmit data or receive data from the system 100, and processor 102 of the system 100 may be configured to conduct example operations described herein.

Figure 2:
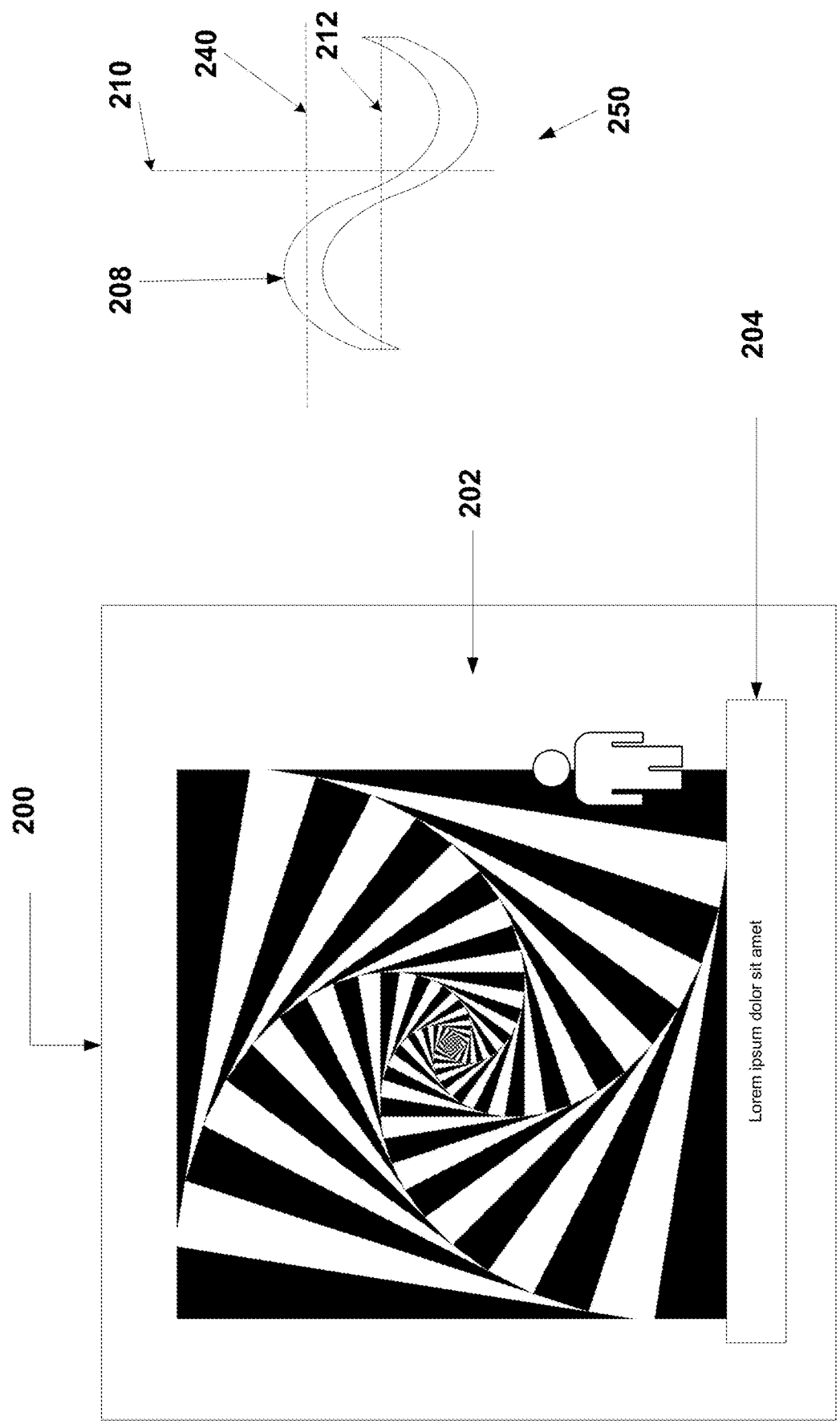
FIG. 2 is a diagram of an example multimedia output device, displaying video data and an example of wave form representation of a time-series acoustic characteristic data, according to some embodiments.

FIG. 2 is a diagram of an example multimedia output device 200 displaying multimedia data and an accompanying wave form representation 250 of a time-series acoustic characteristic data, according to some embodiments.

In the embodiment shown, multimedia output device 200 is displaying an image 202 comprising a black and white fractal and singer based on the multimedia data. In some embodiments, the image 202 is a placeholder image 202 that may be separate from the multimedia data. For example, where a radio program (e.g. Spotify™) is streamed through a multimedia output device 200, the television multimedia output device 200 may apply a default placeholder image 202 in order to indicate that the television multimedia output device 200 is active. The placeholder image 202 may be static, or dynamic, changing over time to provide a user with visual interest.

The multimedia output device 200 is further shown displaying a closed caption output 204 which may include text associated with dialogue related to the image 202. The closed caption output 204 may be located near the bottom of the multimedia output device 200, and may provide users with an understanding of any spoken elements in the multimedia data which correspond to the image 202 on the multimedia output device 200.

A representation 250 of a time-series acoustic characteristic data 208 in a wave form may correspond to the image 202 displayed on the multimedia output device 200. The time-series acoustic characteristic data 208 may be intended to be interpreted simultaneously with the image 202, or more generally the audio data may be intended to complement the visual data within the multimedia data.

Time-series acoustic characteristic data 208 may include any number of and any combination of rhythmic elements, alternatively referred to as elements of time in music. Rhythmic elements may include a duration of a sound or silence. For example, time-series acoustic characteristic data 208 may include a first sound, audible for first duration, or a first sound audible for a second duration.

Rhythmic elements may also include a tempo, defining the number of sounds within a time series. For example, the first sound may be separated from the second sound a first duration, or the first sound may be separated from the second sound by a second duration.

Rhythmic elements may include a plurality of sounds following a structured pattern. For example, rhythmic elements may include a repeating first sound. According to some embodiments, for example, a rhythmic element may include a first sound and a second sound which are separated by a first duration, where the first sound and the second sound are repeated within the audio data.

In some embodiments, rhythmic elements may include any one of, or any combination of sounds having any one of, or any combination of, durations arranged according to any one, or any combination of structured patterns. For example, the rhythmic element may include a first sound which has first duration, a second sound which has a second duration, and a third sound having a third duration, with a separate duration between each sound.

In some embodiments, the rhythmic elements may further be represented by a meter, or syncopation, or any other feature related to a rhythm (e.g. a polyrhythm, etc.).

Time-series acoustic characteristic data 208 may include dynamics elements, alternatively referred to as a relative loudness of music. Dynamics elements may include an accent, such as a fortissimo element.

Time-series acoustic characteristic data 208 may include melodic elements, alternatively referred to as a highness of a musical sound. Melodic elements may include scales.

Time-series acoustic characteristic data 208 may include harmonic elements, alternatively referred to as pitch combinations in a musical sound. Harmonic elements may include harshness, dissonance, and so forth.

Time-series acoustic characteristic data 208 may include any one of, or any combination of the preceding musical elements. Time-series acoustic characteristic data 208 may include any property of music related to or derived from the described time-series acoustic characteristic data, such as tone colour, texture, and so forth.

Referring again to FIG. 2, representation 250, in the shown embodiment, shows the time-series acoustic characteristic data 208 with reference to a time scale 212, and an amplitude scale 210. The representation 250 is intended to be a non-limiting example of the time-series acoustic characteristic data 208, and any number of representations of the time-series acoustic characteristic data 208 are possible.

Rhythmic data sets may be generated based on, for example, processing the multimedia data to determine time-series acoustic characteristic data 208 within the multimedia data. In some embodiments, generating rhythmic data sets includes determining the time-series acoustic characteristic data 208 that satisfy a threshold. The threshold may be based on the time-series acoustic characteristic data 208 having a peak that satisfies a threshold. For example, in representation 250, the time-series acoustic characteristic data 208 is shown having a peak and a trough, and generating rhythmic data sets includes incorporating into a rhythmic data set the peak of the shown time-series acoustic characteristic data as it satisfies the threshold 240. In some embodiments, generating rhythmic data sets includes incorporating into the rhythmic data set time-series acoustic characteristic data 208 with a trough below a threshold.

The threshold may be preconfigured or, or the threshold may be configured to dynamically update as the processor 102 processes the multimedia data. In an illustrative example, the dynamic threshold is used to determine amplitude peaks.

In some embodiments, the threshold is configured to dynamically update based on the preceding or superseding time-series acoustic characteristic data 208 within the multimedia data. For example, a first time-series acoustic characteristic data threshold may be adjusted where the processor 102 determines that the superseding similar time-series acoustic characteristic data 208 would more clearly aid interpretation. For example, where the superseding similar time-series acoustic characteristic data 208 is louder than preceding time-series acoustic characteristic data 208, the quieter time-series acoustic characteristic data may be determined to not satisfy the threshold as they would not aid audio interpretation in light of the louder time-series acoustic characteristic data 208.

In some embodiments, the multimedia data is divided into portions, having a corresponding portion duration (e.g. 10 seconds) of the multimedia data, and the processor 102 dynamically update a threshold for separate portions of the multimedia data. In an illustrative example, the portion duration may be updated dynamically for streaming purposes to reduce latency. The purpose of windowing may be to reduce latency for streaming, therefore the processor 102 (e.g. a processor 102 located on a client device 110) may not have to receive the full multimedia data file to begin processing, rather the processor 102 can process the multimedia data as it receives portions of multimedia data. For example, the processor 102 may be configured to establish a threshold for a first portion of the multimedia data based on a second portion of the multimedia data. In an illustrative example, the portions may be distinct (e.g. as a result of processor 102 speed, the speed of receiving multimedia data, etc.) and a first threshold may have a shorter duration (e.g. 2 seconds) in comparison to a second threshold (e.g. 5 seconds) and the threshold may be adjusted to ensure that both portions incorporate the same amount of rhythmic data per duration. In another illustrative example, the second threshold is based on the first threshold to encourage continuity in determining which time-series acoustic characteristic data 208 are incorporated into the rhythmic data set where the processor 208 is configured to generate fixed rhythmic data per duration.

The processor 102 may, in some embodiments, dynamically update the threshold within the separate portions of the multimedia data. According to some scenarios where the processor 102 is configured to incorporate a maximum amount of time-series acoustic characteristic data 208, as the processor 102 processes the audio data sequentially, the processor 102 may adjust, or revisit, the threshold for time-series acoustic characteristic data 208 in each portion of the of the multimedia data to enforce the maximum amount. Other thresholds may be contemplated, such as a minimum amount.

In some scenarios, generating rhythmic data sets includes incorporating a portion of the time-series acoustic characteristic data 208 that satisfies the threshold. For example, generating rhythmic data sets may include incorporating into the rhythmic data set every trough within the time-series acoustic characteristic data 208 below a threshold. According to some embodiments, where multiple portions of the time-series acoustic characteristic data 208 satisfy a threshold, only the portion which is greatest is incorporated into the rhythmic data set.

Incorporating portions of time-series acoustic characteristic data 208 into the rhythmic data set may include determining a start time and an end of the portion of the time-series acoustic characteristic data 208, or the time-series acoustic characteristic data 208 itself. According to some embodiments, the rhythmic data set includes an onset time (as that term is described herein) and an offset time (as that term is described herein), for each of the time-series acoustic characteristic data 208 that satisfies the threshold. The rhythmic data set may include any data which allows for the processor 102 to determine when and how long to represent the time-series acoustic characteristic data 208. For example, the start time and the end time can be used to determine a duration of a peak of the time-series acoustic characteristic data 208, and either of the start time or the end time and the duration can be used to determine when and how long to utilize the rhythmic data set based on the duration.

The rhythmic data set reference times, such as the start time and the end time, may be associated with the multimedia data. For example, the start time may be indexed to the start time of the visual data in the multimedia data.

In some embodiments, the reference times may be stored to be dependent upon one another. For example, the first start time may be associated with the visual data in the multimedia data, and the remaining reference times may be durations, of each the time-series acoustic characteristic data 208, or absence of the time-series acoustic characteristic data 208 represented by a duration. In some embodiments, each of the time-series acoustic characteristic data 208 above the threshold is represented in the rhythmic data set comprising an onset time and a duration.

The rhythmic data set can be used to generate a sequence of visual elements to display on the multimedia output device 200 to aid audio interpretation. For example, the processor 102 may be configured to generate a sequence of visual elements associated with the rhythmic data set for displaying concurrently with the multimedia data based on the reference times, the reference times being aligned with the video elements in the multimedia data. In some embodiments, the processor 102 may be configured to adjust the multimedia output device 200 based on the rhythmic data set. For example, the multimedia output device 200 may change a color contrast on the screen based on the rhythmic data set.

The sequence of visual elements may not be displayed in response to the rhythmic data set lacking time-series acoustic characteristic data 208 above the threshold for the associated time in the multimedia data. For example, in the embodiment shown in FIG. 2, the amplitude scale 210 and time scale 212 intersection shown in the representation 250 (hereinafter referred to as the intersection) is indicative of an ambient pressure (e.g. 14.7 psi). Ambient pressure recordings can be indicative of inaudible sound being recorded by a listening device or associated with currently displayed image 202 and the processor 102 may be configured to refrain from displaying any sequence of visual elements with the multimedia output device 200, as the sequence of visual elements may not increase user interpretation.

In some embodiments, for example, as seen in FIG. 3A, where the amplitude scale 210 and time scale 212 intersection shown in the representation 250 (hereinafter referred to as the intersection) is indicative of the ambient pressure, the processor 102 may be configured to display a screen interface element 320. The screen interface element 320 may aid audio interpretation by demonstrating a lack of rhythmic data set being associated with the current image 202 displayed on the multimedia output device 200. In some embodiments, the screen interface element 320 is used to indicate to a user that the processor 102 is operating to display visual elements where there is an absence of rhythmic data associated with the image 202.

Portions of the time-series acoustic characteristic data 208 which are representative of ambient pressure, or relatively lower amplitude compared to the preceding portions of the wave, may indicate that the subsequent portions of the time-series acoustic characteristic data 208, or subsequent time-series acoustic characteristic data 208, and unlikely to pass the threshold, and are therefore unlikely to be incorporated into the rhythmic data set (alternatively referred to as "offset time(s)"). For example, a loud note may be gradually decreasing and therefore a subsequent portion(s) of the one or more of the time-series acoustic characteristic data 208 indicative of further decreasing of loudness of the note may be excluded from the rhythmic data set as it does not aid in interpreting the audio data.

In some embodiments, portions of the time-series acoustic characteristic data 208 may be indicative of subsequent time-series acoustic characteristic data 208 that are likely to satisfy the threshold and therefore are likely to be incorporated into the rhythmic data set. For example, there may be a period of anticipation prior to a loud note being played. For example, FIG. 3B, shows a diagram of the multimedia output device 200 displaying a sequence of visual elements 322 and wave form representation 260 of a time-series acoustic characteristic data 206, according to some embodiments. In the shown embodiment, the intersection is indicative of an "onset," and the subsequent peak in the representation may be incorporated in the rhythmic data set.

Referring again to FIG. 3B, the screen interface element 320 is shown comprising a sequence of visual elements 322. In the embodiment shown, the sequence of visual elements 322 includes two separate clusters of box images, and the screen interface element 320 is outlined. In example embodiments, the sequence of visual elements 322 may include text, for example a flashing "Boom" text for a low frequency beat. The sequence of visual elements 322 may include any combination, shape, type, thickness, transparency, size, etc., of visual elements. The screen interface element 320 may include any combination, shape, type, thickness, transparency, size, etc. of outlines. For example, referring to FIGS. 4A-4E, diagrams of example sequences of visual elements 322 and screen interface element 320 are shown.

FIG. 4A shows an embodiment where the screen interface element 320 is not outlined and contains the sequence of visual elements 322. FIG. 4B shows an embodiment where the sequence of visual elements 322 consists of 3 box elements. FIG. 4C shows an embodiment where the sequence of visual elements 322 is integrated with the outline of the screen interface element 320.

FIG. 4D shows an embodiment where the sequence of visual elements 322 is a series of smiling faces, which may be displayed in response to the processor 102 determining that the rhythmic data set is indicative of time-series acoustic characteristic data 208 associated with happiness. Similarly, FIG. 4E shows an embodiment where the sequence of visual elements 322 is a series of clapping hands, which may be displayed in response to the processor 102 determining that the rhythmic data set is indicative of percussive time-series acoustic characteristic data 208 associated with clapping.

The sequence of visual elements 322 may be Unicode characters. For example, the sequence of visual elements 322 may include U+0394, representative of the triangle like Greek capital letter delta.

The sequence of visual elements 322 may be toggled on or off, relocated on the multimedia output device 200, increased or decreased in size, increased or decreased in transparency, or otherwise change during a single time-series acoustic characteristic data 208, or between multiple time-series acoustic characteristic data 208 within the rhythmic data set.

The sequence of visual elements 322 may be uniform, or each element in the sequence of visual elements 322 may be varied in respect of any visual properties.

In some embodiments, not shown, the sequence of visual elements 322 may be toggled on or off by a user, similar to a closed caption. For example, a dentist may turn off the sequence of visual elements 322 when all patients have left and silence does not need to be observed.

The sequence of visual elements 322 may be any symbol that is cross language (e.g. irrespective of language) such as a single line of rectangles. Internationalization may be an important part of making the rhythmic data set accessible to people experiencing the content who are not fluent in the primary language.

The sequences of visual elements 322 and screen interface element 320 are displayed on a display location of the multimedia output device 200. In the shown embodiments, the display location of the sequences of visual elements 322 and screen interface element 320 are near the top and center of the multimedia output device 200. The display location may be near the top the multimedia output device 200 so that the sequences of visual elements 322 doesn't interfere with any other closed captions channels, such as closed caption output 204. In some embodiments, the sequences of visual elements 322 and screen interface element 320 are at any display location on the multimedia output device 200, without impeding the closed caption output 204. In some embodiments, the sequences of visual elements 322 are one of multiple captions channels displayed on the multimedia output device 200.

Figure 5:
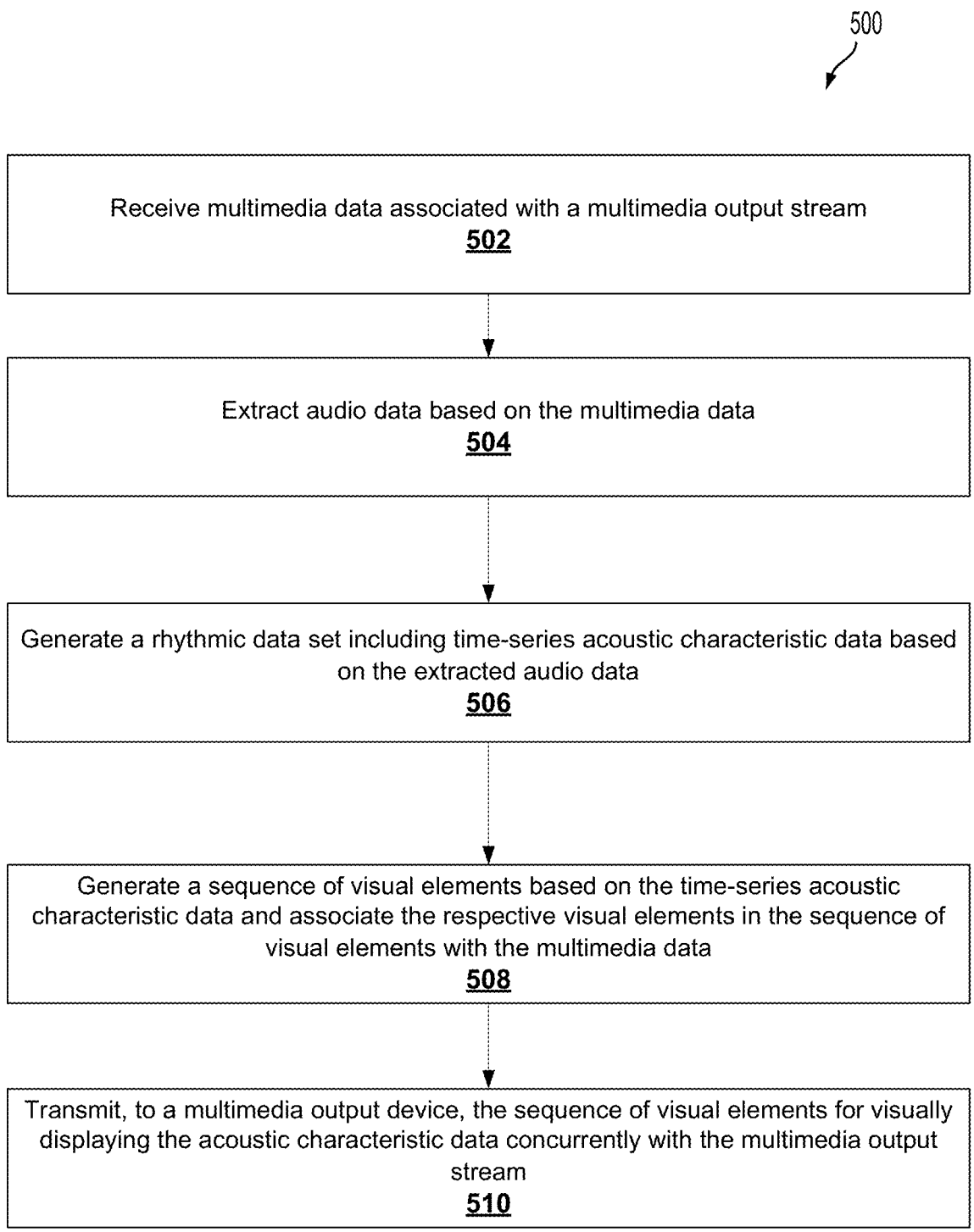
FIG. 5 is an example method for generating rhythmic data sets for audio interpretation, in accordance with some embodiments.

Reference is made to FIG. 5, which illustrates a flowchart of a method 500 of providing acoustic output, in accordance with an embodiment of the present disclosure. The method 500 may be conducted by the processor 102 (100) of a computing device. In some examples, the computing device may be the system 100 of FIG. 1. Processor readable instructs may be stored in the memory 106 and may be associated with the audio application 112 or other processor readable applications not illustrated in FIG. 1. In some embodiments, the computing device may be the client device 110 of FIG. 1. In some embodiments, the client device 110 may be a television, a personal computer, or any other multimedia output device.

To illustrate features of the present disclosure, the system 100 may conduct operations for receiving multimedia data, such as a video stream, and for providing visual elements to provide acoustic characteristic data concurrently with a multimedia output stream. In some embodiments, the multimedia data may include other types of media that includes audio data, where the audio data may include music or acoustic output associated with rhythmic data set.

At operation 502, the processor may receive multimedia data associated with a multimedia output stream. For example, the processor may receive, from a video storage server, video data that may provide video output on a television screen, or some other output screen. In some embodiments, the multimedia data may include data associated with one or more combinations of content forms, such as text, audio, images, animations, video, or interactive content. Multimedia data having other data types may be contemplated.

At operation 504, the processor may extract audio data based on the multimedia data. Audio data may be a recorded representation of sound and may be recorded in analog form (e.g. analog signal waveform) or in digital form (e.g. recorded as a series of 1s and 0s). In some embodiments, the processor may conduct audio processing operations for extracting audio data from the multimedia data. In some examples, the processor may conduct operations of software library suites, such as the FFmpeg, or other software libraries, for extracting audio data from the multimedia data.

In the above described example, when the multimedia data is a video stream, the audio data may include sounds that represent spoken words, music, environmental sounds, or other acoustic sounds that a user may hear when the multimedia output stream may be displayed on a television, computer monitor, Internet video streaming webpage or any other display device.

At operation 506, the processor may generate a rhythmic data set including time-series acoustic characteristic data based on the extracted audio data. As an illustrating example, the extracted audio data may include musical data for playback of a music video, and the rhythmic data set may include data representing rhythm. As acoustic data representing music may be based on a combination of time-series acoustic characteristic data, at operation 506, the processor may generate the rhythmic data set to identify acoustic characteristic data associated with the music.

For example, for music, rhythm may be associated with the element of time. When a user of the system 100 taps their foot to music, the user may "keep the beat" or follow a structural rhythmic pulse of the music. In some examples, data associated with rhythm may include data associated with duration (e.g. how long a sound or silence lasts) or tempo (e.g. speed of a beat), which may be associated with a number of beats per second.

In some embodiments, data associated with rhythm may include an element known as meter. For instance, when beats may be organized into recurring accent patterns, the resulting pattern may be a recognizable meter. For example, a "duple meter" may be associated with two pulses per group or 2/4 time, a "triple meter" may be associated with three pulses per group or 3/4 time, or a "quadruple meter" may be associated with four pulses per group or 4/4 time.

In some embodiments, data associated with rhythm may include other elements, such as syncopation (e.g. putting accents "off-the-beat", ritardando (e.g. gradually slowing down the temp), accelerando (e.g. gradually speeding up the temp), or polyrhythm (e.g. more than one independent rhythm or meter happening simultaneously).

At operation 508, the processor may generate a sequence of visual elements based on the time-series acoustic characteristic data and associate the respective visual elements in the sequence of visual elements with the multimedia data. In some embodiments, visual elements may include the example visual elements illustrated in FIGS. 4A to 4E, or any other types of geometric shapes.

In some embodiments, when a computing device plays back a multimedia output stream on a display device, the computing device may provide closed caption, such as a series of subtitles or text that may convey words/speech corresponding to the multimedia output stream. In some embodiments of the present disclosure, the generated sequence of visual elements associated with time-series acoustic characteristic data may be displayed along side or in addition to the closed caption output, such that a user of the computing device may visually experience the rhythm of music. Embodiments of the present disclosure may provide computing devices for assisting users who may be in an acoustically noisy environment having visual line-of-sight of a display screen with capability to experience acoustic characteristics of music, such as rhythm or for users who may not be able to hear acoustic output from a computing device.

At operation 510, the processor may transmit, to a multimedia output device, the sequence of visual elements for visually displaying the acoustic characteristic data concurrently with the multimedia output stream. In some embodiments, the processor may transmit, to the multimedia output device, a combination of the sequence of visual elements and the multimedia data for visually displaying the characteristic data concurrently with the multimedia stream.

In some embodiments, the processor may be a feature the server 100 of FIG. 1. Once the processor generates the rhythmic data set and associated sequence of visual elements, the processor may transmit, via a network, the rhythmic data set and associated sequence of visual elements to a display device for playback. For example, the display device may be a television, personal computer device, a mobile device, or the like that may be streaming content from the server.

In some other embodiments, the processor conducting the operations described in the present disclosure may be a processor of a client device 110 (FIG. 1). That is, the client device 110 may be configured to receive the multimedia data from a video/audio server and may be configured to conduct operations for generating the rhythmic data set and associated sequence of visual elements for visually providing acoustic output, such that a user may experience acoustic characteristics of music. The sequence of visual elements displayed concurrently with the multimedia output stream may provide supplemental output such that a user may experience music or other audible output even when a full audio experience may not be available.

In some embodiments of the present disclosure, audio data may be associated with acoustic characteristic data including data associated with polyrhythm, such as two or more simultaneously occurring rhythms. In some embodiments, the audio data may be stored as an analog signal waveform representation. In some embodiments, the processor may conduct operations to generate the rhythmic data set based on: (1) filtering the analog signal waveform based on at least one of a band pass filter, a low pass filter, and a high pass filter to provide a filtered analog signal waveform associated with a frequency range of the audio data; and (2) detect amplitude peaks based on threshold analysis of the filtered analog signal waveform. In some embodiments, the processor may detect rhythm data based on other characteristics, in addition to or in place of detecting amplitude peaks, of the analog signal waveform.

In the present example, when the processor conducts operations to filter the analog signal waveform, the processor may generate multiple audio signal waveform channels associated with sounds having a frequency range associated with a filter (e.g. low-pass, band-pass, high-pass, etc.). The respective audio signal waveform channels may be associated with a particular rhythm. For instance, low-frequency components of the analog signal waveform may include an underlying "bass" rhythm that may be carried throughout a song or musical score. High-frequency components of the analog signal waveform may include a separate rhythm that may be associated with a melody of the song or musical score. Accordingly, by filtering the analog signal waveform, the processor may conduct operations to generate two or more channels of visual elements associated with particular channels of acoustic characteristic data (e.g. rhythmic data set).

Continuing with the present example, the processor may generate a sequence of visual elements for the respective audio data channels and may present two or more subsets of visual elements concurrently with a multimedia output stream for displaying acoustic characteristic data (e.g. rhythm) for a song or musical score.

In some embodiments, generating a rhythmic data set may include identifying amplitude peaks over time or within periodic time-windows on the analog signal waveform based on configured thresholds.

In some embodiments, the audio data may be stored as digital data in a data set. In some embodiments, the processor may generate the rhythmic data set by sampling the audio data based on a sample rate and, subsequently, identify acoustic characteristic data based on identifying patterns within the digital data representing acoustic output (e.g. a song, musical score, etc.).

Figure 6:
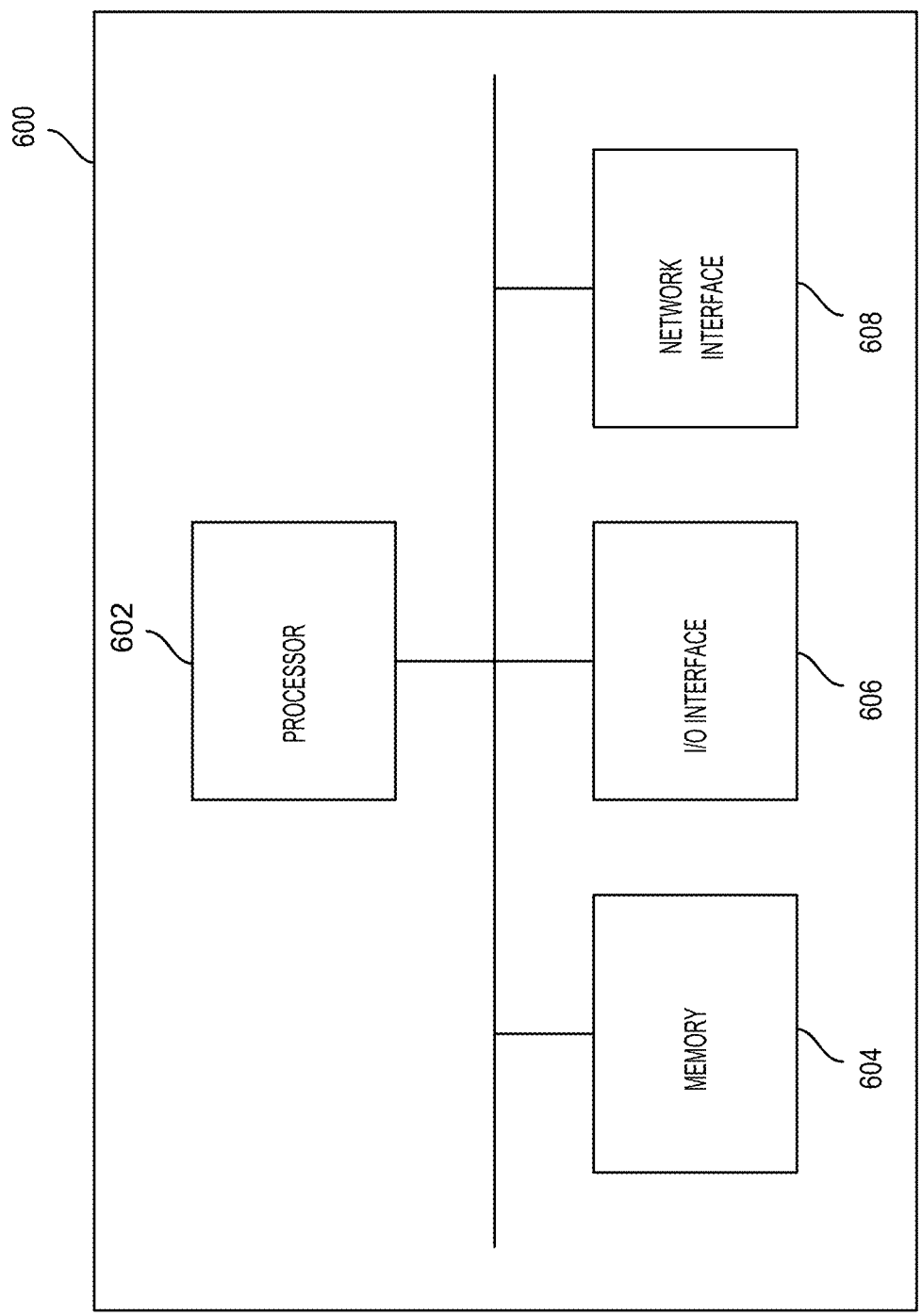
FIG. 6 is an example computing system, according to some embodiments.

FIG. 6 is a schematic diagram of a computing device 600 such as a server, which in some embodiments, may be a special purpose machine that may be configured for generating rhythmic data sets for aiding audio interpretation, having, for example, specialized hardware components and/or software components.

As depicted, the computing device includes at least one processor 602, memory 608, at least one I/O interface 606, and at least one network interface 608.

Processor 602 may be an Intel or AMD x86 or x64, PowerPC, ARM processor, or the like. Memory 604 may include a combination of computer memory that is located either internally or externally such as, for example, random-access memory (RAM), read-only memory (ROM), compact disc read-only memory (CDROM).

The I/O interface 606 may enable the computing device 600 to interconnect with one or more input devices, such as a keyboard, mouse, camera, touch screen and a microphone, or with one or more output devices such as a display screen and a speaker.

The network interface 608 may enable the computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others.

Figure 7:
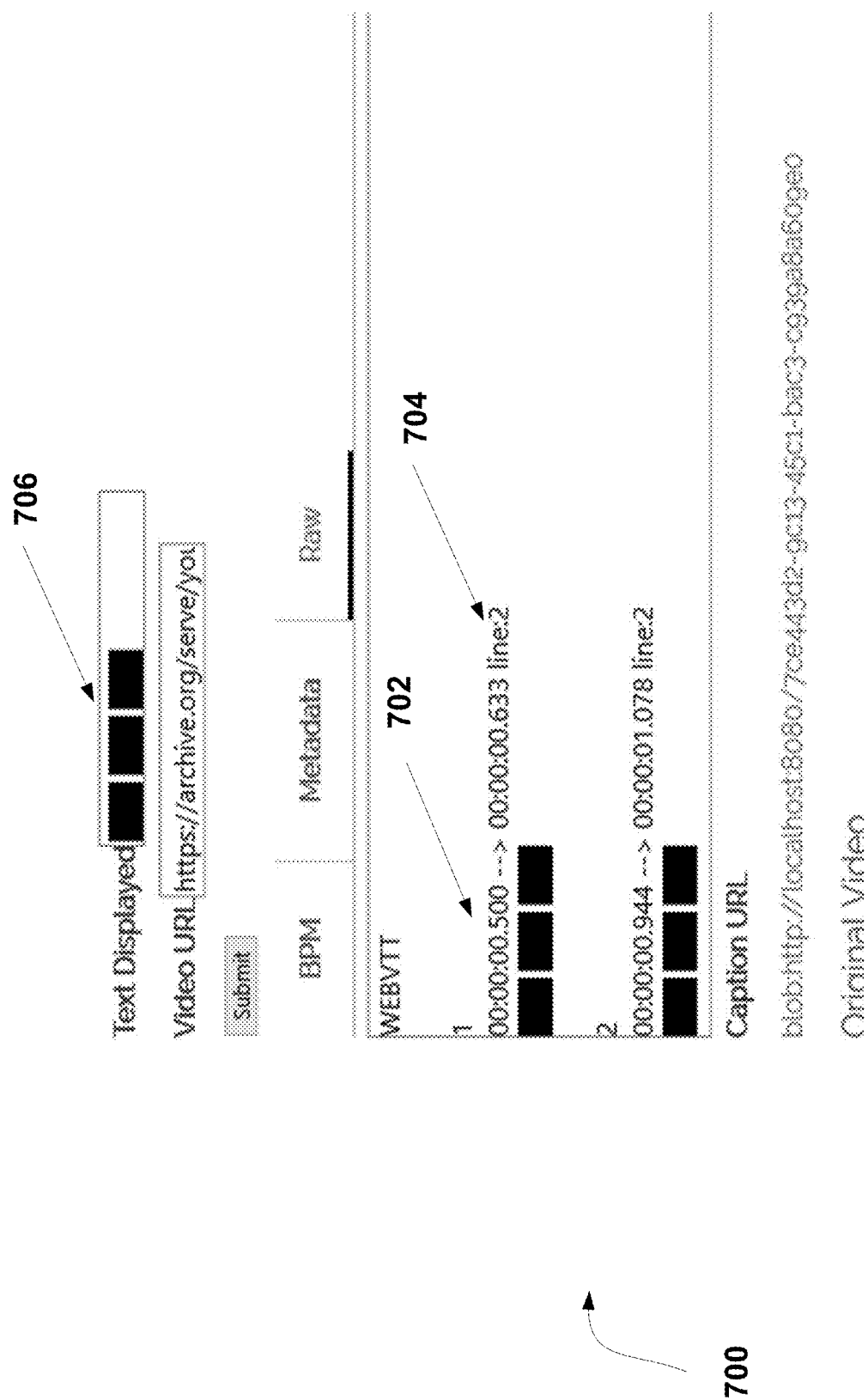
FIG. 7 is a diagram of an example code representation of the WebVTT rhythmic data set for audio interpretation generated by an example processor, according to some embodiments.

FIG. 7 is a diagram 700 of an example code representation of the rhythmic data set generated by processor 102 for audio interpretation, according to some embodiments.

Diagram 700 is representative of computer code that, when executed by a processor, displays the sequence of visual elements 322 (FIG. 3B). The computer code shown in diagram 700 is in a Web Video Text Tracks (WebVTT) format. In some embodiments, the rhythmic data set stored in a WebVTT format is capable of being processed by an internet agent (not shown) to generate the sequence of visual elements 322.

In the shown embodiment, the computer code includes a start time 702, an end time 704, and an intended sequence of visual elements 322. As discussed herein the computer code may include one of a start time, end time, duration, onset time, offset time, or other reference time, depending on the requirements of the multimedia output device 200, or the agent responsible for processing the rhythmic data set or sequence of visual elements 322.

Figure 8:
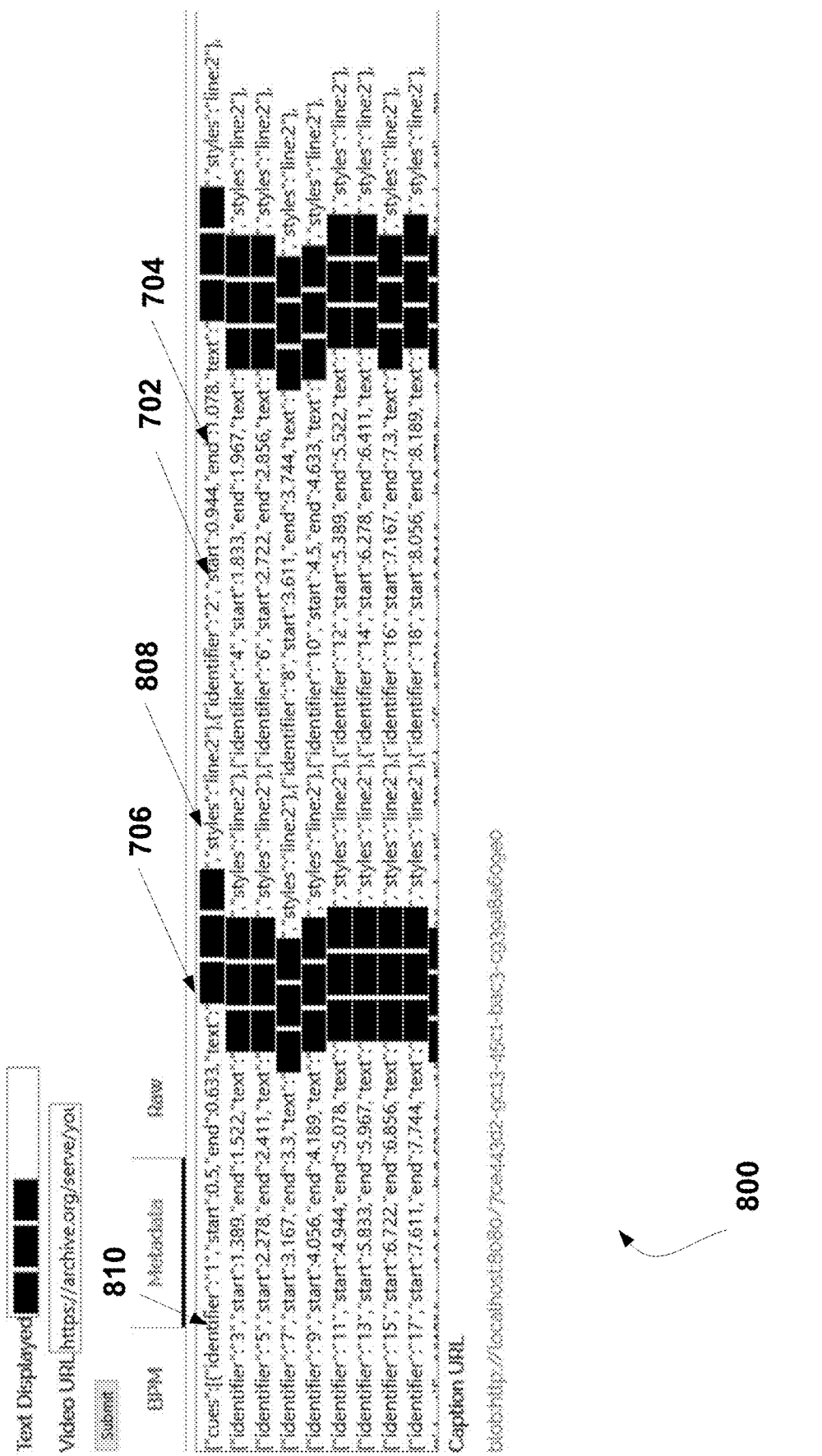
FIG. 8 is a diagram of an example code representation of the JSON rhythmic data set for audio interpretation generated by an example processor, according to some embodiments.

Referring now to FIG. 8, a diagram 800 of an example code representation of the rhythmic data set for audio interpretation generated by processor 102 is shown, according to some embodiments.

Diagram 800, similar to diagram 700, is representative of computer code that, when executed by a processor, displays the sequence of visual elements 322. The computer code shown in diagram 800 is in a Web Video Text Tracks (WebVTT) format.

The computer code shown in diagram 800 includes a start time 702, an end time 704, an intended sequence of visual elements 322, an identifier 808 (which is used solely for reference purposes in the shown embodiment), and a display location of the sequence of visual elements 810.

Figure 9:
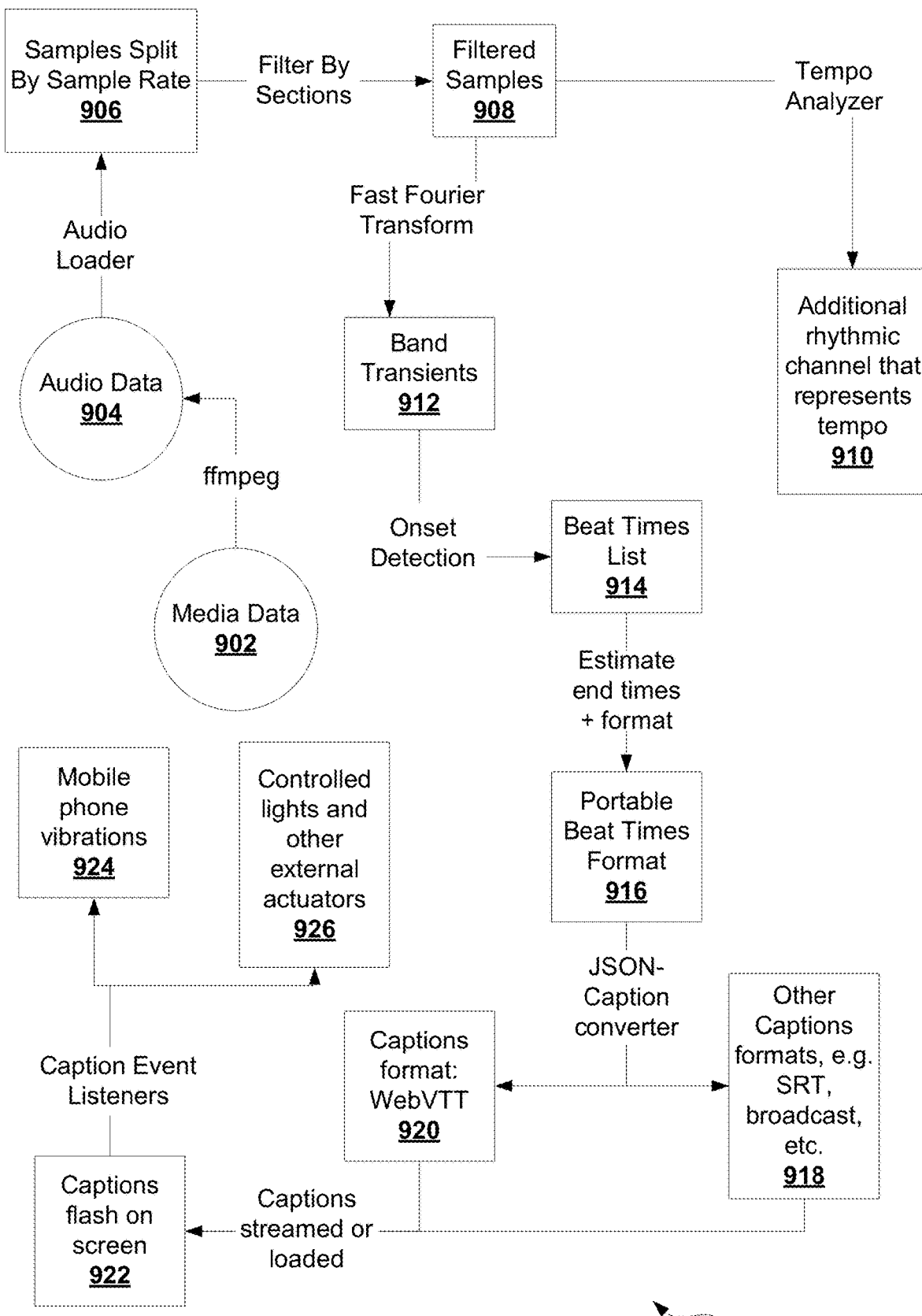
FIG. 9 is a flow chart showing multimedia data being processed by an example processor, according to some embodiments.

FIG. 9 is a flow chart 900 showing multimedia data 902 being processed by, for example, the processor 102 of system 100 for audio interpretation, according to some embodiments. The flow chart 900 is intended to be a non-limiting example of multimedia data 902 being processed according to a beat tracking system for audio interpretation of beat time-series acoustic characteristic data 208. Any type of multimedia data 902, processed according to any system, for any type or combination of time-series acoustic characteristic data 208 may be contemplated.

The processor 102 receives the multimedia data 902 associated with a multimedia output stream. An illustrative example of a multimedia output stream includes a sporting event being broadcast live. A further illustrative example of a multimedia output stream includes a movie being retrieved from memory on a client device 110 (e.g. a personal computer, a personal mobile device) and displayed.

Processor 102 may extract audio data 904 comprising time-series acoustic characteristic data 208 based on the multimedia data 902. In some embodiments, the audio data 904 may be extracted from the multimedia data based on an extraction algorithm, for example the algorithms maintained by Fast Forward Moving Pictures Expert Group (ffmpeg). Other methods of extracting audio data 904 may be contemplated. The audio data 904 may be separately stored within the multimedia data 902, and determining the audio data 904 may include extracting the audio data 904.

In some embodiments, the multimedia data 902 may be a digital representation of audio and video information, and extracting the audio data 904 includes extracting the digital representation of the audio data 904 from the digital representation multimedia data 902. Other algorithms for extracting digital audio data 902 from the digital representation multimedia data 902 are contemplated.

In the embodiment shown, generating the rhythmic data set including time-series acoustic characteristic data 208 based on the extracted audio data 904 includes sampling the audio data 904 based on a configured time-window. For example, the audio data may be processed with an audio buffer loading algorithm, to generate configured time-window data sets 906 comprising subsets of the audio data 904 (e.g. configured time-windows) having time-series acoustic characteristic data 208.

In an illustrative embodiment, the audio buffer loading algorithm may be configured to bring the audio data 904 into a file buffer memory from data storage, such as a hard drive, and provide functions that make it easier to process. In example embodiments, the audio buffer loading algorithm splits the audio data 904 into 2 separate data channels (left audio and right audio), and one, both, or any combination of any channels may subsequently be filtered, sampled, etc.

The audio data 904 may be sampled in order to manage computing resources. For example, the processor 102 may be able to work efficiently in parallel and process multiple time-series acoustic characteristic data 208 at the same time, and therefore split the audio data into configured time-window data sets 906.

In some embodiments, generating configured time-window data sets 906 includes sampling the audio data 904 into configured time-window data sets 906 (alternatively referred to as "windows") lasting a configured time-window data set portion (e.g. 10 seconds) (alternatively referred to as "window size"). Sampling the audio data 904 into configured time-window data set portions may enable the processor 102 to process the audio data 904 at a speed acceptable for real-time streaming. Configured time-window data set portions can be any length, and in some embodiments, a larger window, for example an 11 second window, or smaller window, for example, a 9 second window, is used. The window may be dynamically recalibrated based on the real time performance of processor 102.

A window may be configured to be larger than a threshold size to avoid inaccurate detection of the time-series acoustic characteristic data 208. For example, the window size may be limited to windows greater than 1 second when the processor 102 is determining time-series acoustic characteristic data 208 which are typically longer than 1 second, such as a melody.

The configured time-window data sets 906 can vary in the amount of audio data 904 stored within the configured time-window data set (i.e. the granularity of sampling). For example, each configured time-window data set 906 may include a portion of audio data 904 sampled according to a separate sample rate (e.g. the amount of the audio data 904 portion that is retained in the configured time-window data set). For example, where an audio data 904 portion contains 4 peaks within time-series acoustic characteristic data 208, but the sampling rate is configured to store only 2 peaks for each of the time-series acoustic characteristic data 208, the configured time-window data set 906 may include only the 2 largest peaks.

The sample rate may be based on the computing resources of system 100, for example, the capacity of the processor 608. Similar to the windows, the sample rate may be dynamically recalibrated based on processor 102 real time performance. According to some embodiments, for example, the sampling rate is lower across all configured time-window data sets 906 based on computing power limitations within the system 100.

The algorithm used to generate the configured time-window data set 906 may configure a sampling rate based on whether the portions of the audio data 904 used to make the configured time-window data set 906 contain more or less time-series acoustic characteristic data 208. For example, when the algorithm is configured to find time-series acoustic characteristic data 208 comprising a beat (peaks), which may be referred to as a beat tracking system, the algorithm may determine portions of the audio data 904 with low variation in amplitude (and therefore less likely to have beats), and sample such portions with lower granularity.

In some embodiments, the audio data 904 may not be sampled in order to generate the rhythmic data set. For example, the audio data 904 may be small so that the processor 102 is capable of processing the audio data 904 with the available computing resources.

Where the audio data 904 is a digital representation of audio information, sampling the audio data 904 based on a configured time-window data set 906 may comprise identifying time-series acoustic characteristic data 208 based on digital data pattern recognition. Other methods of identifying or generating time-series acoustic characteristic data based on digital representation of audio information may be contemplated.

In the embodiment shown, the configured time-window data set 906 may be filtered. In some embodiments, the configured time-window data set 906 may be filtered to exclude time-series acoustic characteristic data 208 which do not satisfy a threshold, as described herein.

In an illustrative example where the configured time-window data set 906 of audio data 904 is an analog signal waveform, the generating the rhythmic data may include filtering the analog signal waveform based on at least one of a band pass filter, a low pass filter, and a high pass filter to provide a filtered analog signal waveform associated with a frequency range the configured time-window data set 906 of the audio data 904. The processor 102 may detect amplitude peaks based on threshold analysis of the analog signal waveform for each filtered waveform.

In some embodiments, the configured time-window data set 906 may include data which is not indicative of interpretable time-series acoustic characteristic data 208. For example, the threshold may be based on whether the configured time-window data set 906 includes time-series acoustic characteristic data 208 which are not audible. In some embodiments, the configured time-window data set 906 includes time-series acoustic characteristic data 208 which are too close to one another and would not be interpretable with sequences of visual elements 322.

According to some embodiments, for example, the configured time-window data sets 906 may be filtered based on one or more operations. In an illustrative embodiment, a first channel (alternatively referred to as a main channel) includes the configured time-window data sets 906 filtered across the entire human-audible frequency spectrum, a second channel includes the configured time-window data sets 906 filtered with a low pass-filter to capture bass-ranged sounds, a third channel includes the configured time-window data sets 906 filtered with a band pass-filter for mid-ranged sounds, and a third channel includes the configured time-window data sets 906 filtered with a high pass-filter for high range sounds.

The rhythmic data may comprise any one of, and any combination of time-series acoustic characteristic data 208. For example in a beat tracking system, the rhythmic data may include beat data associated with at least one of low-frequency range acoustic data, mid-frequency range acoustic data, and high frequency range acoustic data.

Generating the rhythmic data set may include generating two or more subsets of visual elements, with respective subsets of visual elements associated with rhythmic data for a frequency range. For example, each frequency may be set to display a separate sequence of visual elements 322 for the time-series acoustic characteristic data 208 detected within the channel to aid audio interpretation. In an illustrative example, the sequence of visual elements 322 may include a foot emoji where the time-series acoustic characteristic data 208 are detected in the low-range channel. The sequence of visual elements 322 in the rhythmic data associated with a low frequency may include the foot emoji to signal to a user that active participation is suggested, for example a suggestion that the user stomp, or identify the type of frequency range information that is being conveyed by the sequence of visual elements 322.

In some embodiments, the sequence of visual elements 322 may include clap emoji where the time-series acoustic characteristic data 208 are detected for the mid-range channel, encouraging the user to clap. The sequence of visual elements 322 may include a point emoji where the time-series acoustic characteristic data 208 are detected for the high-range channel, indicating a user should snap.

Any number of filters directed to any number of the time-series acoustic characteristic data 208 may be used. For example, the configured time-window data set 906 may also be filtered based on a tempo analyzer in order to generate a rhythmic channel data indicative of tempo 910.

The processor 102 may be configured to covert the configured time-window data set 906, using a Fast Fourier Transform (FFT), into band transients 912. For example, the FFT may process the audio data 904, which may be analog data, into binary data or digital data. The FFT may shift the data or filtered samples 908 into the frequency domain.

The band transients 912 may be processed by the processor 102 to determine a list of reference times of the time-series acoustic characteristic data 208, which may be incorporated into the rhythmic data set. The list of reference times associate the respective visual elements in the sequence of visual elements 322 with the multimedia data 902. For example, the reference list may indicate that a sequence of visual elements 322 is displayed at a time corresponding to the first minute the multimedia data 902.

The reference times, such as the start time and the end time, are associated with the multimedia data 902. For example, the start time may be indexed to the start time of the visual data in the multimedia data 902. In some embodiments, the reference times may be dependent upon one another. For example, the first start time may be associated with the multimedia data 902, and the remaining reference times associated with the first start time. For example, the reference time may be a start time, and subsequent reference times may be sequential durations of each of the time-series acoustic characteristic data 208, or absence of the time-series acoustic characteristic data 208. In some embodiments, each of the time-series acoustic characteristic data 208 above the threshold is represented in the rhythmic data set comprising an onset time and a duration.

The list of reference times may include any data which allows for the processor 102 to determine when and how long to represent the time-series acoustic characteristic data 208. For example, an onset time and offset time can be used to determine a duration of a time-series acoustic characteristic data 208, the duration and start time of the time-series acoustic characteristic data 208 being associated with the multimedia data 902. In some embodiments a duration is estimated based on an onset time.

According to some embodiments, for example, the reference times of time-series acoustic characteristic data 208 can be a list of the timing associated with any type or kind or combination of time-series acoustic characteristic data 208. For example, the beat time list 914 may incorporate timing associated with melodic time-series acoustic characteristic data 208 and rhythmic time-series acoustic characteristic data 208. For example, a beat tracking system can incorporate timing associated with beat time-series acoustic characteristic data 208.

In the embodiment shown in FIG. 9, as part of determining a list of reference times associated with the time-series acoustic characteristic data 208, a beat time list 914 is generated based an onset detection algorithm detecting beat elements within the band transients 912.

In the embodiment shown in FIG. 9, the beat times list 914 may be further processed by the processor 102 to estimate the end time associated with the respective beat element onset time within the band transients 912 to generate a portable beat times format 916.

The processor 102 processing the band transients 912 to determine the beat times format 916 can be configured to generate the list of reference times according to a desired format. For example, the processor 102 may be configured to generate the list of reference times which are compliant with an internet agent (e.g. an internet browser). For example, an internet agent may require that the reference times used to display the sequence of visual elements 322 include a start time and a duration, as opposed to a start time and an end time, of the time-series acoustic characteristic data 208.

The processor 102 processing the band transients 912 to determine the portable beat times format 916 may be configured to generate a generic, indexed file in a JavaScript Object Notation (JSON) format, which allows the rhythmic data set to be easily converted to other standards, including, for example, a SubRip Subtitle (SRT) format for YouTube™, or a format for live cable television channels such as Electronic Industries Alliance 608 (EIA-608).

In some embodiments, processing the band transients 912 to determine the portable beat times format 916 may include determining whether the time-series acoustic characteristic data 208 that are in the reference list satisfy a threshold. According to some embodiments, for example, the threshold may be based on an interpretable duration, the interpretation duration representative of a duration required for a user to interpret the visual sequence of visual elements 322 in one image as conveying information separate from the sequence of visual elements 322 in a second image in a video. For example, where the time-series acoustic characteristic data 208 are shorter than a user's ability to perceive the visual sequence of visual elements 322 from the start time to end time in the reference list (e.g. a beat lasts a fraction of a second), the aforementioned time-series acoustic characteristic data 208 may not satisfy the threshold.

In some embodiments, the threshold may be based on the amount of time between the one or more time-series acoustic characteristic data 208. For example, where two time-series acoustic characteristic data 208 are separated by a duration that is not interpretable by a user (e.g. the duration is so short that a user would not perceive two separate visual elements), the system may be configured to determine that the shorter time-series acoustic characteristic data 208 does not satisfy a threshold.

The processor 102 may be configured to incorporate an interpretation duration into the reference time associated with any one, or combination of the one or more time-series acoustic characteristic data 208 which do not satisfy the threshold in order to adjust the non satisfactory one or more time-series acoustic characteristic data 208 to satisfy the threshold. For example, processor 102 may, where a first time-series acoustic characteristic data is too short, increase the duration of the time-series acoustic characteristic data in scenarios where there are no other time-series acoustic characteristic data reference times that would be affected. For example, where a time-series acoustic characteristic data 208 is a fraction of a second, and does not satisfy the threshold, the processor 102 may extend the duration of the time-series acoustic characteristic data 208 to satisfy the threshold.

The processor 102 may be configured to incorporate the interpretation duration at any time. For example, the processor 102 may be configured to incorporate the interpretation during processing band transients 912 to determine the beat time list 914, or during determining the portable beat times format 916.

According to some embodiments, the incorporating the interpretation duration into the time-series acoustic characteristic data 208 may include adjusting any one of, and in any combination, the start time, the end time, the onset time, the offset time, the duration, etc.

In some embodiments, the processor 102 may processes the portable beat times format 916 into a display format including the sequence of visual elements 322. In the embodiment shown, the processor 102 processes the portable beat times format 916 into a WebVTT caption 920, with the sequence of visual elements 322 in a format accepted by the WebVTT standard. In some embodiments, the processor 102 can process the portable beat times format 916 into any caption format 918, including the SRT format, a format for broadcasting over television, and so forth. Hereinafter, the rhythmic data set in a caption format is referred to generically as a "rhythmic caption".

Processing the portable beat times format 916 into a WebVTT caption 920 may be an efficient method to aid audio interpretation, including musical information and environmental effects. The WebVTT format has an existing infrastructure for delivering for closed captions. A WebVTT caption 920 may include a start and end time start and end time for rhythms, similar to closed caption output 204 having a start and end time to spoken text.

In some scenarios, the processor 102 processes the portable beat times format 916 into a single format, and in other scenarios the processor 102 processes the portable beat times format 916 into multiple formats.

The processor 102 in some embodiments is configured to generate a caption, for example, the WebVTT caption 920 or caption format 918, directly from the beat times list 912, without generating a portable beat times format 916.

The processor 102 may be configured to assign a default sequence of visual elements 322 to all rhythmic data sets. In some embodiments, the processor 102 may be configured to assign separate sequences of visual elements 322 to differing rhythmic data sets, for example the sequences of visual elements 322 may vary by channel used to extract the time-series acoustic characteristic data 208. In some embodiments, the sequence of visual elements 322 assigned to the rhythmic data set may be configured by a user, whether a system user, or a multimedia output device 200 user, and so forth.

Similar to the sequence of visual elements 322, the processor 102 may be configured to assign the format of the screen interface element 320.

The rhythmic caption may be transmitted by the processor 102 in order to aid audio interpretation.

In some embodiments, the rhythmic caption may be transmitted to the multimedia output device 200, for visually displaying the time-series acoustic characteristic data 208 concurrently with the multimedia data 902, as shown in 922. For example, referring to FIGS. 3A-3B, the sequence of visual elements 322 may be displayed concurrently with the image 202. The sequence of visual elements 322 may include at least one of a geometric shape, an emoticon, and a screen interface element 320 in combination with closed caption output 204 associated with the multimedia output stream.

According to an illustrative embodiment, the sequence of visual elements 322 is a threshold distance from the closed caption output 204, such that the sequence of visual elements 322 and the closed caption output 204 are not coincident on the display of the multimedia output device 200.

In some embodiments, visually displaying the time-series acoustic characteristic data 208 concurrently with the multimedia data 902 includes pulsating, on the multimedia output device 200, the sequence of visual elements 322 based on the acoustic characteristic data 208.

In an illustrative embodiment the rhythmic caption is transmitted by the processor 102 to a remote processor (not shown) to trigger a further event. For example, processor 102 may transmit the rhythmic caption to a client device 110 (FIG. 1) configured to vibrate based on the rhythmic captions (e.g., mobile phone vibrations 924). In some embodiments, processor 102 may transmit the rhythmic caption to an actuator 926 configured to operate based on the rhythmic captions. For example, the actuator 926 may be a light, which may be configured to turn on and off based on the rhythmic caption. Any actuator capable of changes to the visual or sensory environment of a user may be used (e.g. a game console), including any actuator capable of vibrating (e.g. a chair), toggling on and off, and so forth.

The WebVTT caption 920 may allow for efficient integration of various effects based on rhythmic data sets. For example, the WebVTT format includes events that an actuator 926, controlled by an internet agent, such as a browser, can trigger using the WebVTT caption 920, such as flashing lights, triggering vibrations, and other effects described.

In some embodiments, example WebVTT code portion may be as follows:
00:00:01.235-→00:00:01.343
♪
00:00:01.635-→00:00:01.723
♪

In some embodiments, example hypertext mark-up language (HTML) audio WebVTT code portion may be as follows:

```
<audio>
    <source src="song.mp3" >
    <track src="rhythms.vtt" kind="subtitles" label="Rhythm" >
</audio>
```

In some embodiments, example HTML video WebVTT code portion may be as follows:

```
<video>
    <source src="video.mp4" >
    <track src="subtitles.vtt" kind="captions" label="Subtitles" >
    <track src="rhythms.vtt" kind="subtitles" label="Rhythm" >
</video>
```

In some embodiments, the events performed by the actuator 926 may be generated independently by third parties and incorporated into the rhythmic captions, without reliance upon multimedia data creators and publishers. The triggers for the events, in some embodiments, can be embedded in audio data 904. For example, a multimedia data creator can include components in the audio data 904 which are know to instruct smart lights to flicker.

The WebVTT caption 920 can be streamed alongside real-time HLS video. Part of WebVTT is also setting the position of the where the captions are shown.

In some embodiments, the multimedia output device 200 may be a component of or within the processor 102. The multimedia output device 200 may be external to system 100, and the processor 102 may transmit the rhythmic caption via the network 150. For example, the multimedia output device 200 may be a personal computer, and the processor 102 may be a system operated by a multimedia data creator such as Netflix™.

In some embodiments, a process for relaying rhythmic information about audio or video data may be based on the time position within the audio or video media using superimposed visuals including images, text, symbols, or characters.

In some embodiments, using existing closed captioning and subtitling methods to relay beat tracking or other rhythmic data of audio or video media to devices. This includes the generation and use of WebVTT to indicate the beginning and end times of each beat. This also includes closed captions standards that deliver live captions over cable, such as EIA-608.

Figure 10:
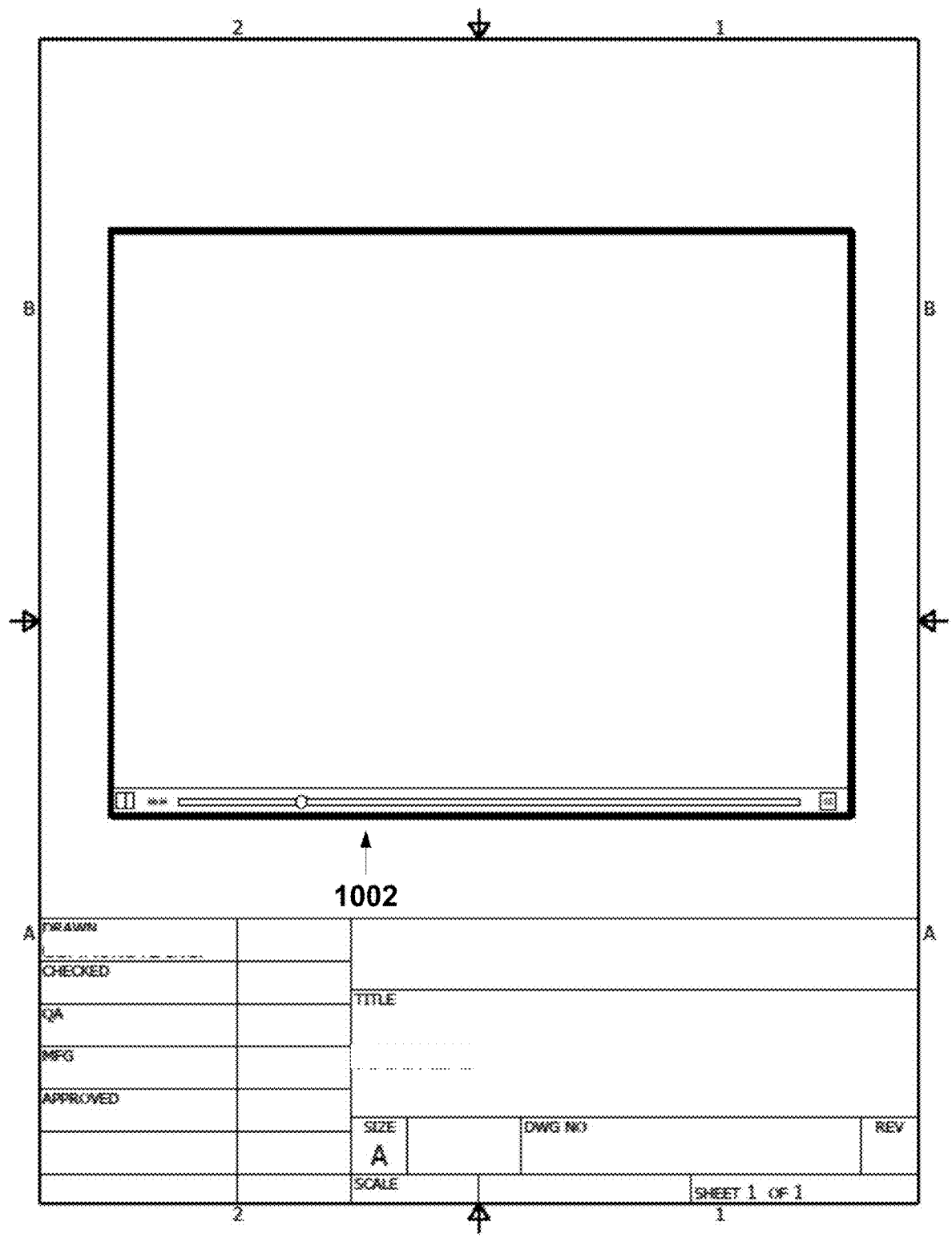
FIG. 10 is a diagram of an example multimedia output device, according to some embodiments.
Figure 11:
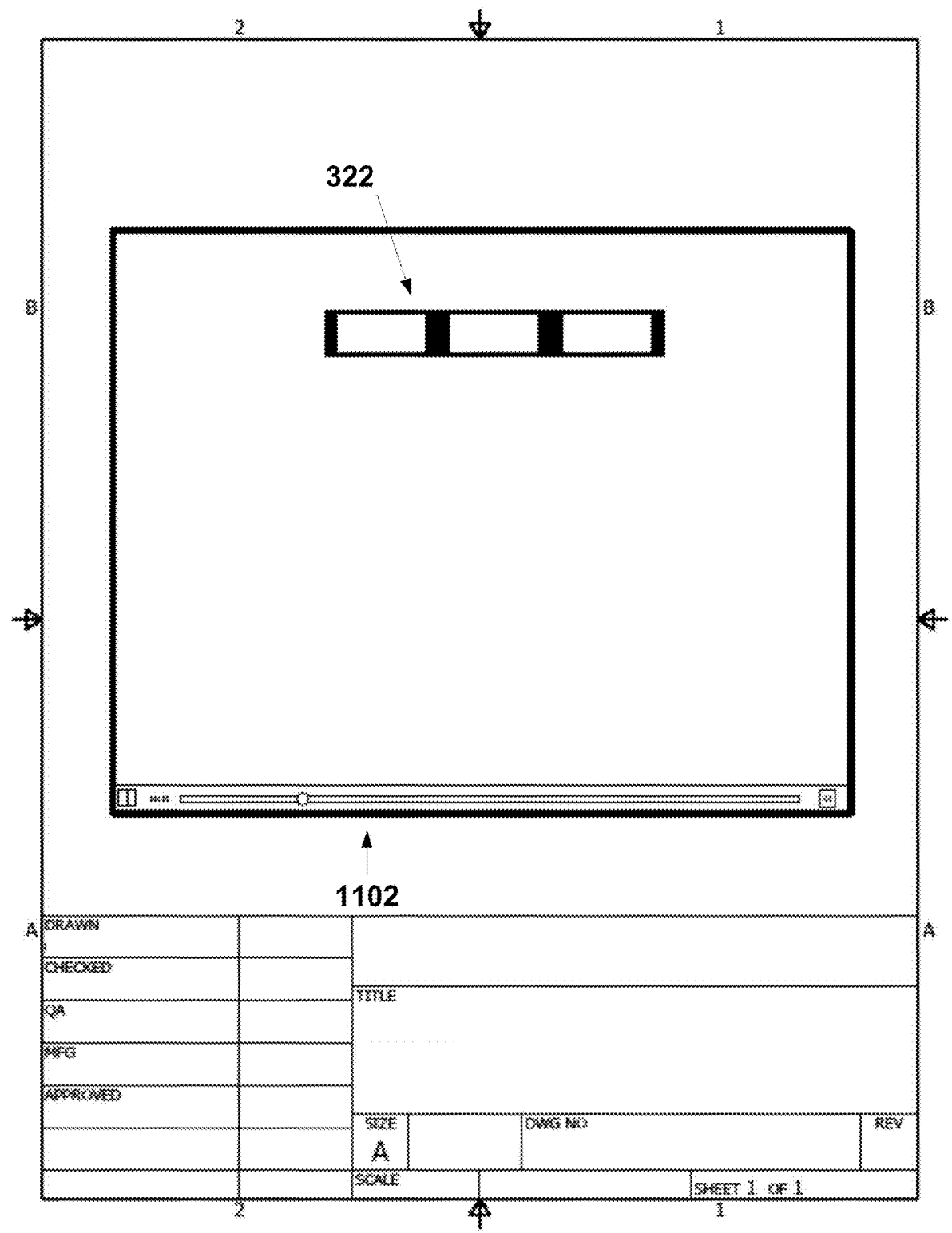
FIG. 11 is a diagram of an example multimedia output device displaying a sequence of visual elements, according to some embodiments.
Figure 12:
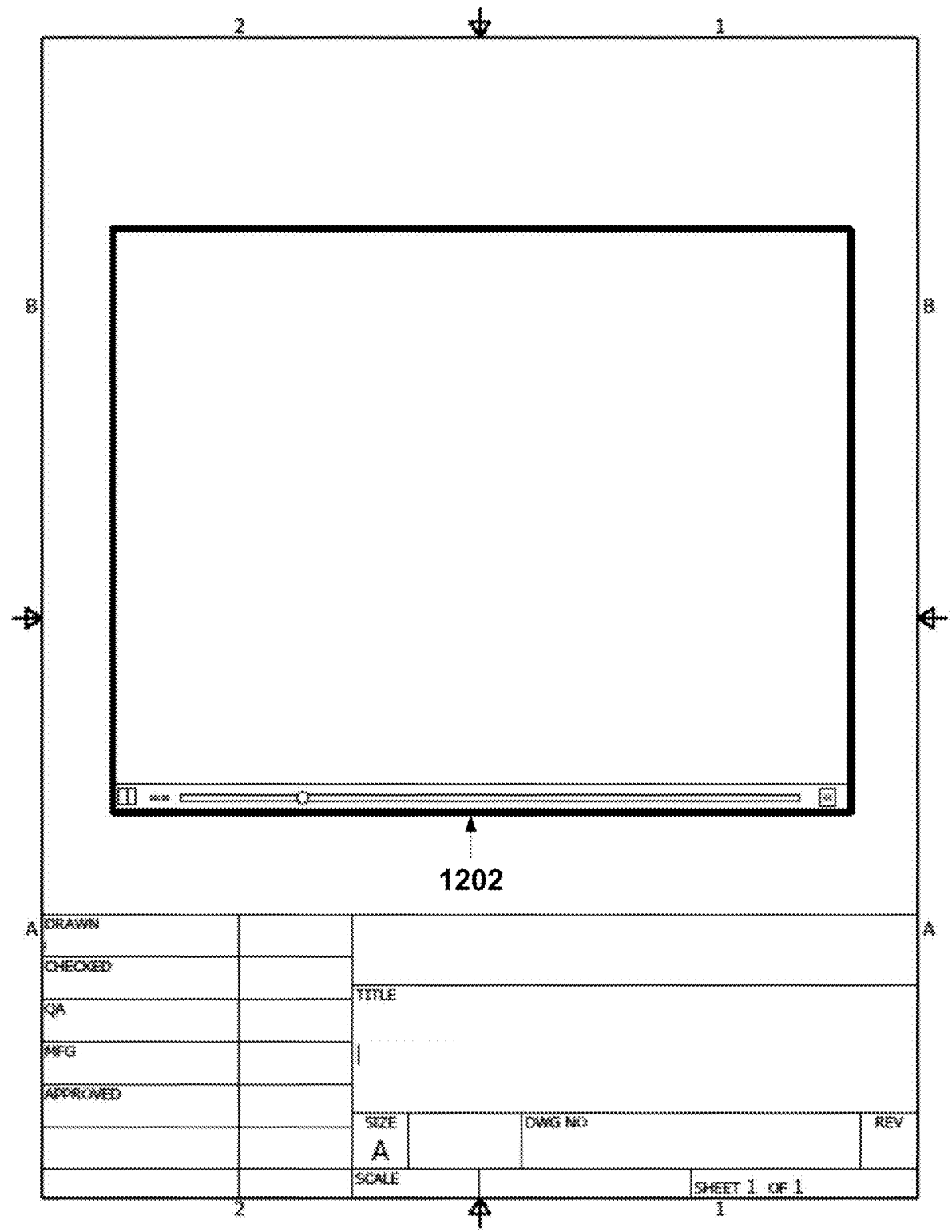
FIG. 12 is a diagram of an example multimedia output device, according to some embodiments.

The embodiments shown in FIGS. 10-12, including diagrams 1000, 1100, and 1200, having screens 1002, 1102, and 1202, respectively, show multimedia video data being displayed at three respective subsequent times in the multimedia data. In the screen 1002, a sequence of visual elements is not displayed as there may be no corresponding rhythmic data. In the screen 1102, the sequence of visual elements 322 is displayed in response to corresponding rhythmic data associated with the time representative of screen 1102 in the multimedia data. In screen 1202, the sequence of visual elements 322 is not displayed as there may be no corresponding rhythmic data.

The computing devices are electronic devices that include processors (e.g. hardware computer processors), and computer memory, and operate in conjunction with data storage, which may be local or remote. Software may be affixed in the form of machine-interpretable instructions stored on non-transitory computer readable media, which cause a processor to perform steps of a method upon execution.

In some embodiments, the computing devices are specially adapted special purpose machines, such as rack server appliances, that are configured to be installed within data centers and adapted for interconnection with back-end data sources for generating and/or maintaining one or more rhythmic data set sets.

Variations

Additional variations are described in this section. The variations are not meant to be limiting, and other variations are possible.

The discussion provides many embodiments of the inventive subject matter. Although each embodiment represents a single combination of inventive elements, the inventive subject matter is considered to include all possible combinations of the disclosed elements.

Thus if one embodiment includes elements A, B, and C, and a second embodiment includes elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices.

In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk.

The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

What is claimed is:

1. A system for providing acoustic output comprising:
   a processor; and
   a memory coupled to the processor and storing processor-executable instructions that, when executed, configure the processor to:
      receive multimedia data associated with a multimedia output stream;
      extract audio data based on the multimedia data;
      generate a rhythmic data set including time-series acoustic characteristic data based on the extracted audio data;
      generate a sequence of visual elements based on the time-series acoustic characteristic data and associate the respective visual elements in the sequence of visual elements with the multimedia data; and
      transmit, to a multimedia output device, the sequence of visual elements for visually displaying the acoustic characteristic data concurrently with the multimedia output stream,
   wherein the audio data includes an analog signal waveform, and wherein generating the rhythmic data set includes:
      filtering the analog signal waveform based on at least one of a band pass filter, a low pass filter, and a high pass filter to provide a filtered analog signal waveform associated with a frequency range of the audio data; and
      detecting amplitude peaks based on threshold analysis of the filtered analog signal waveform.

2. The system of claim 1, wherein the time-series acoustic characteristic data includes at least one of beat, meter, tempo, syncopation, and polyrhythm data.

3. The system of claim 1, wherein visually displaying the acoustic characteristic data concurrently with the multimedia stream includes pulsating, on the multimedia output device, the sequence of visual elements based on the acoustic characteristic data.

4. The system of claim 1, wherein generating the rhythmic data set includes sampling the extracted data based on a configured time-window.

5. The system of claim 1, wherein the generated rhythmic data set includes two or more subsets rhythmic data, the respective subsets of rhythmic data associated with rhythmic data for a frequency range.

6. The system of claim 1, wherein detecting amplitude peaks is based on a dynamic threshold.

7. The system of claim 1, wherein the rhythmic data set includes two or more acoustic characteristic data sets, the two or more acoustic characteristic data sets including beat data associated with at least one of low-frequency range acoustic data, mid-frequency range acoustic data, and high frequency range acoustic data, and wherein the two or more acoustic characteristic data sets are respectively associated with a distinct sequence of visual elements.

8. The system of claim 1, wherein the audio data includes a digital data set, and wherein generating the rhythmic data set includes sampling the audio data based on a sample rate and identifying acoustic characteristic data based on digital data pattern recognition.

9. The system of claim 1, wherein the sequence of visual elements includes at least one of a geometric shape, an emoticon, and a screen interface element in combination with closed caption output associated with the multimedia output stream.

10. A method of providing acoustic data output, the method comprising:
    receiving multimedia data associated with a multimedia output stream;
    extracting audio data based on the multimedia data;
    generating a rhythmic data set including time-series acoustic characteristic data based on the extracted audio data;
    generating a sequence of visual elements based on the time-series acoustic characteristic data and associate the respective visual elements in the sequence of visual elements with the multimedia data; and
    transmitting, to a multimedia output device, the sequence of visual elements for visually displaying the acoustic characteristic data concurrently with the multimedia output stream,
    wherein the audio data includes an analog signal waveform, and wherein generating the rhythmic data set includes:
       filtering the analog signal waveform based on at least one of a band pass filter, a low pass filter, and a high pass filter to provide a filtered analog signal waveform associated with a frequency range of the audio data; and
       detecting amplitude peaks based on threshold analysis of the filtered analog signal waveform.

11. The method of claim 10, wherein the time-series acoustic characteristic data includes at least one of beat, meter, tempo, syncopation, and polyrhythm data.

12. The method of claim 10, wherein visually displaying the acoustic characteristic data concurrently with the multimedia stream includes pulsating, on the multimedia output device, the sequence of visual elements based on the acoustic characteristic data.

13. The method of claim 10, wherein generating the rhythmic data set includes sampling the extracted data based on a configured time-window.

14. The method of claim 10, wherein the generated rhythmic data set includes two or more subsets rhythmic data, the respective subsets of rhythmic data associated with rhythmic data for a frequency range.

15. The method of claim 10, wherein the rhythmic data set includes two or more acoustic characteristic data sets, the two or more acoustic characteristic data sets including beat data associated with at least one of low-frequency range acoustic data, mid-frequency range acoustic data, and high frequency range acoustic data, and wherein the two or more acoustic characteristic data sets are respectively associated with a distinct sequence of visual elements.

16. The method of claim 10, wherein the audio data includes a digital data set, and wherein generating the rhythmic data set includes sampling the audio data based on a sample rate and identifying acoustic characteristic data based on digital data pattern recognition.

17. The method of claim 10, wherein the sequence of visual elements includes at least one of a geometric shape, an emoticon, and a screen interface element in combination with closed caption output associated with the multimedia output stream.

18. A non-transitory computer-readable medium or media having stored thereon machine interpretable instructions which, when executed by a processor, cause the processor to perform a computer implemented method of providing acoustic data output, the method comprising:
   receiving multimedia data associated with a multimedia output stream;
   extracting audio data based on the multimedia data;
   generating a rhythmic data set including time-series acoustic characteristic data based on the extracted audio data;
   generating a sequence of visual elements based on the time-series acoustic characteristic data and associate the respective visual elements in the sequence of visual elements with the multimedia data; and
   transmitting, to a multimedia output device, the sequence of visual elements for visually displaying the acoustic characteristic data concurrently with the multimedia output stream,
   wherein the audio data includes an analog signal waveform, and wherein generating the rhythmic data set includes:
      filtering the analog signal waveform based on at least one of a band pass filter, a low pass filter, and a high pass filter to provide a filtered analog signal waveform associated with a frequency range of the audio data; and
      detecting amplitude peaks based on threshold analysis of the filtered analog signal waveform.

\* \* \* \* \*